(12) United States Patent
Jennings et al.

(10) Patent No.: US 12,375,422 B2
(45) Date of Patent: Jul. 29, 2025

(54) RESILIENT DATA PLANE PROCESSING USING MULTIPLE NETWORK STREAMS

(71) Applicant: Cisco Technology, Inc., San Jose, CA (US)

(72) Inventors: Cullen Frishman Jennings, Calgary (CA); Vincent E. Parla, North Hampton, NH (US); Thomas Brennan Gillis, Jr., Los Altos, CA (US); Stephen Craig Connors, Jr., Nashville, TN (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/583,429

(22) Filed: Feb. 21, 2024

(65) Prior Publication Data

US 2025/0088469 A1    Mar. 13, 2025

Related U.S. Application Data

(60) Provisional application No. 63/581,893, filed on Sep. 11, 2023.

(51) Int. Cl.
*H04L 47/80* (2022.01)
*H04L 47/2441* (2022.01)

(52) U.S. Cl.
CPC .......... *H04L 47/80* (2013.01); *H04L 47/2441* (2013.01)

(58) Field of Classification Search
CPC ............................ H04L 47/80; H04L 47/2441
See application file for complete search history.

(56) References Cited

U.S. PATENT DOCUMENTS

| | | | |
|---|---|---|---|
| 9,639,910 B2* | 5/2017 | Geyzel | G06T 1/0021 |
| 10,425,339 B2* | 9/2019 | Thubert | H04L 47/125 |
| 11,496,628 B2* | 11/2022 | Bhoria | H04M 15/64 |
| 2017/0289215 A1 | 10/2017 | Lundrigan et al. | |
| 2020/0120555 A1 | 4/2020 | Patil et al. | |
| 2021/0399960 A1 | 12/2021 | Cunningham et al. | |
| 2023/0208752 A1 | 6/2023 | Axelsson et al. | |

FOREIGN PATENT DOCUMENTS

WO    2023179891 A1    9/2023

* cited by examiner

*Primary Examiner* — Minh Chau Nguyen
(74) *Attorney, Agent, or Firm* — Baker Botts L.L.P.

(57) ABSTRACT

An apparatus configured to perform resilient data plane processing using multiple network streams may comprise a memory and a processor communicatively coupled to one another. The processor may be configured to establish a connection with the data aggregator, and request access to one or more resources from a data aggregator. Further, the processor may be configured to receive a first data stream and a second data stream from the data aggregator, combine a version of the first data stream and a version of the second data stream into a local data stream, and present the local data stream.

20 Claims, 9 Drawing Sheets

RESILIENT DATA PLANE PROCESSING USING MULTIPLE NETWORK STREAMS

RELATED APPLICATIONS

This application claims priority to U.S. Patent Application Ser. No. 63/581,893, filed Sep. 11, 2023, which is hereby incorporated by reference in its entirety.

TECHNICAL FIELD

The present disclosure relates generally to a field of data plane processing and more particularly, to perform resilient data plane processing operations using multiple network streams.

BACKGROUND

In certain communication networks, data streams comprising cloud resources may drop in quality. In audiovisual streams including audio data and visual data, the drops in quality may cause video data to be unsynchronized from audio data and/or video data and/or audio data to be dropped. The drops in quality may be caused by an amount of traffic on a network connection and/or interruptions in the internet connection.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Figure 1:
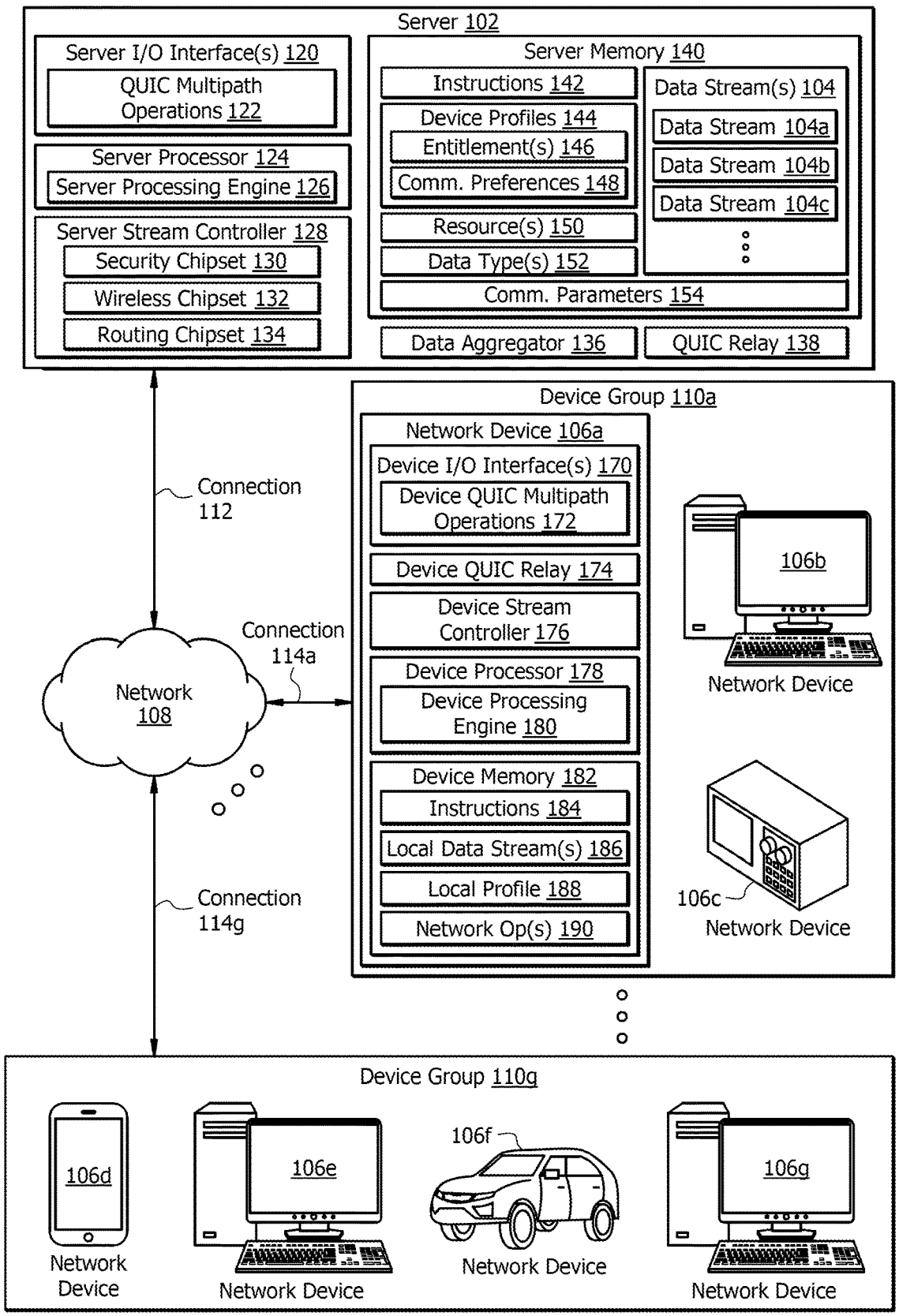
FIG. 1 illustrates a system for resilient data plane processing using multiple network streams, according to one or more embodiments of the present disclosure.

In one or more embodiments, systems and methods described herein perform resilient data plane processing operations using multiple network streams. The systems and methods may be configured to optimize data distribution operations over communication networks. The systems and methods may be configured to perform reliable data exchange operations to prevent or mitigate poor quality connections. For example, the systems and methods may be configured to provide optimal data exchanging operations from data received from streaming services (e.g., WebEx, Zoom, and the like). In this regard, the data exchange operations may be optimized to prevent unintelligible data streams. In one or more embodiments, the systems and methods comprise a model that utilizes network devices (e.g., network devices connected in a network) to repair packet losses and provide high-quality data streams regardless of network connection quality (e.g., a poor internet connection). In some embodiments, the systems and methods comprise a model that utilizes Media Over QUIC (MoQ) relays installed in access points throughout a data transportation. In other embodiments, the method comprises a model that utilizes Multipath QUIC, which may split a QUIC connection into multiple network paths.

In accordance with one or more embodiments, the systems and methods may comprise one, some, or all of the embodiments described herein. The systems and methods may be performed by an apparatus, such as a network device. Further, the system may comprise the apparatus. In addition, the systems and methods may be performed as part of a process performed by the apparatus. As a non-limiting example, the apparatus may comprise a memory and a processor communicatively coupled to one another. The memory may be configured to store a local profile configured to indicate an association with a data aggregator configured to split one or more data streams. The processor may be configured to establish a connection with the data aggregator, and request access to one or more resources from the data aggregator. The data aggregator may be configured to obtain the one or more resources and split the one or more resources into a first data stream comprising first data packets and a second data stream comprising second data packets. Further, the processor may be configured to receive the first data stream upon performing first network operations, receive the second data stream upon performing second network operations, determine whether the first data packets and the second data packets are of a same type, determine that the second data packets are configured to replicate the first data packets in response to determining that the first type of data packets and the second type of data packets are the same type, determine that the second data packets are configured to supplement the first data packets in response to determining that the first type of data packets and the second type of data packets are not the same type, combine a version of the first data stream and a version of the second data stream into a local data stream, and present the local data stream.

In certain embodiments, the processor is further configured to determine whether the second packets comprise the first data packets in conjunction with determining that the second data packets are configured to replicate the first data packets, determine packet loss on the second data stream in response to determining that the second data packets do not comprise the first data packets, and receive a packet loss-corrected data stream from the data aggregator. The first data stream is the version of the first data stream received upon performing the first network operations. The packet loss-corrected data stream is the version of the second data stream configured to correct the packet loss on the second data stream.

In some embodiments, the processor is further configured to determine whether the second data packets comprise the first data packets in conjunction with determining that the second data packets are configured to replicate the first data packets, and determine no packet loss on the second data stream in response to determining that the second data packets comprise the first data packets. The version of the first data stream is the first data stream received upon performing the first network operations. The version of the second data stream is the second data stream received upon performing the second network operations.

In yet other embodiments, the first data stream is a video parity stream, the first data stream is received via a first network device configured to forward the first data stream between the data aggregator and the apparatus, the first network device receives the first data stream via one or more cellular network communications from the data aggregator, the first network operations comprise one or more short-range wireless communications, and the second data stream is a high-definition video stream. Further, the second data stream is received via a second network device configured to forward the second data stream between the data aggregator and the apparatus, the second network device receives the second data stream via one or more internet network communications from the data aggregator, and the second network operations comprise one or more additional internet network communications.

In accordance with other embodiments, the first data stream comprises a first bandwidth, the first data stream is received from the data aggregator upon performing first multipath Quick UDP Internet Connections (QUIC) operations, the first network operations comprise one or more cellular network communications, the second data stream comprises a second bandwidth, and the second bandwidth is greater than the first bandwidth. Further, the second data stream is received via a network device configured to forward the second data stream between the data aggregator and the apparatus upon performing first multipath QUIC operations; the network device receives the second data stream via one or more internet network communications from the data aggregator, and the second network operations comprise one or more additional internet communications. In some embodiments, the first QUIC relay is a first portion of a transport layer network protocol configured to multiplex data between the data aggregator and the apparatus and the second QUIC relay is a second portion of the transport layer network protocol configured to multiplex data between the data aggregator and the apparatus.

In one or more embodiments, the first data stream comprises a first bandwidth, the first data stream is received from the data aggregator upon performing first multipath QUIC operations, the first network operations comprise one or more cellular communications, the second data stream comprises a second bandwidth, the second bandwidth is greater than the first bandwidth, the second data stream is received via a network device configured to forward the second data stream between the data aggregator and the apparatus upon performing first multipath QUIC operations, the network device receives the second data stream via one or more internet communications from the data aggregator, and the second network operations comprise one or more additional internet communications.

In accordance with other embodiments, one or more methods performed by the systems include establishing a connection with a data aggregator configured to split one or more data streams, and requesting access to one or more resources from the data aggregator. The data aggregator may be configured to obtain the one or more resources and split the one or more resources into a first data stream comprising first data packets and a second data stream comprising second data packets. The method may further comprise receiving the first data stream upon performing first network operations, receiving the second data stream upon performing second network operations, determining whether the first data packets and the second data packets are of a same type, determining that the second data packets are configured to replicate the first data packets in response to determining that the first type of data packets and the second type of data packets are the same type, determining that the second data packets are configured to supplement the first data packets in response to determining that the first type of data packets and the second type of data packets are not the same type, combining a version of the first data stream and a version of the second data stream into a local data stream, and presenting the local data stream.

In accordance with yet other embodiments, a non-transitory computer readable medium storing instructions that when executed by a processor cause the processor to establish a connection with a data aggregator configured to split one or more data streams, and request access to one or more resources from the data aggregator. The data aggregator may be configured to obtain the one or more resources and split the one or more resources into a first data stream comprising first data packets and a second data stream comprising second data packets. Further, the instructions cause the processor to receive the first data stream upon performing first network operations, receiving the second data stream upon performing second network operations, determining whether the first data packets and the second data packets are of a same type, determining that the second data packets are configured to replicate the first data packets in response to determining that the first type of data packets and the second type of data packets are the same type, determining that the second data packets are configured to supplement the first data packets in response to determining that the first type of data packets and the second type of data packets are not the same type, combining a version of the first data stream and a version of the second data stream into a local data stream, and presenting the local data stream.

Technical advantages of certain embodiments of this disclosure may include one or more of the following. This disclosure describes systems and methods for preventing downtime of network device requesting high-quality data or servers transmitting high-quality data as the network devices are always provided with high-quality content. In certain embodiments, the systems and methods described herein combine one or more technical solutions (e.g., multipath QUIC) to provide the technical advantage of maintaining reliable data exchanges between the cloud services and the network devices. Certain systems and methods described herein prevent human resources, processing resources, and memory resources from being wasted by trying to optimize individual rendering of data streams at the network devices. Instead, the systems and methods described herein provide constant error-corrected streams to the network devices.

In addition, the systems and methods described herein are integrated into practical applications of optimizing processor usage and improving power consumption in the system. Specifically, the system and the method optimize processor usage by monitoring and raising alarms if streaming operations are determined to be lossy and/or whether data packets are considered to drop in quality. Further, the systems and methods are integrated into practical applications of improving quality of data being streamed without increasing bandwidth requirements of internet connections by transmitting data packets in a data stream received at least partially via cellular connections. The systems and methods may prevent losses of processing resources and/or memory resources by dynamically adapting data streams of multiple types into a single data stream. In this regard, the systems and methods are configured to A) alternate data packets in the data streams and/or B) duplicating data packets on the data streams based on an identified quality of a local data stream.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 2:
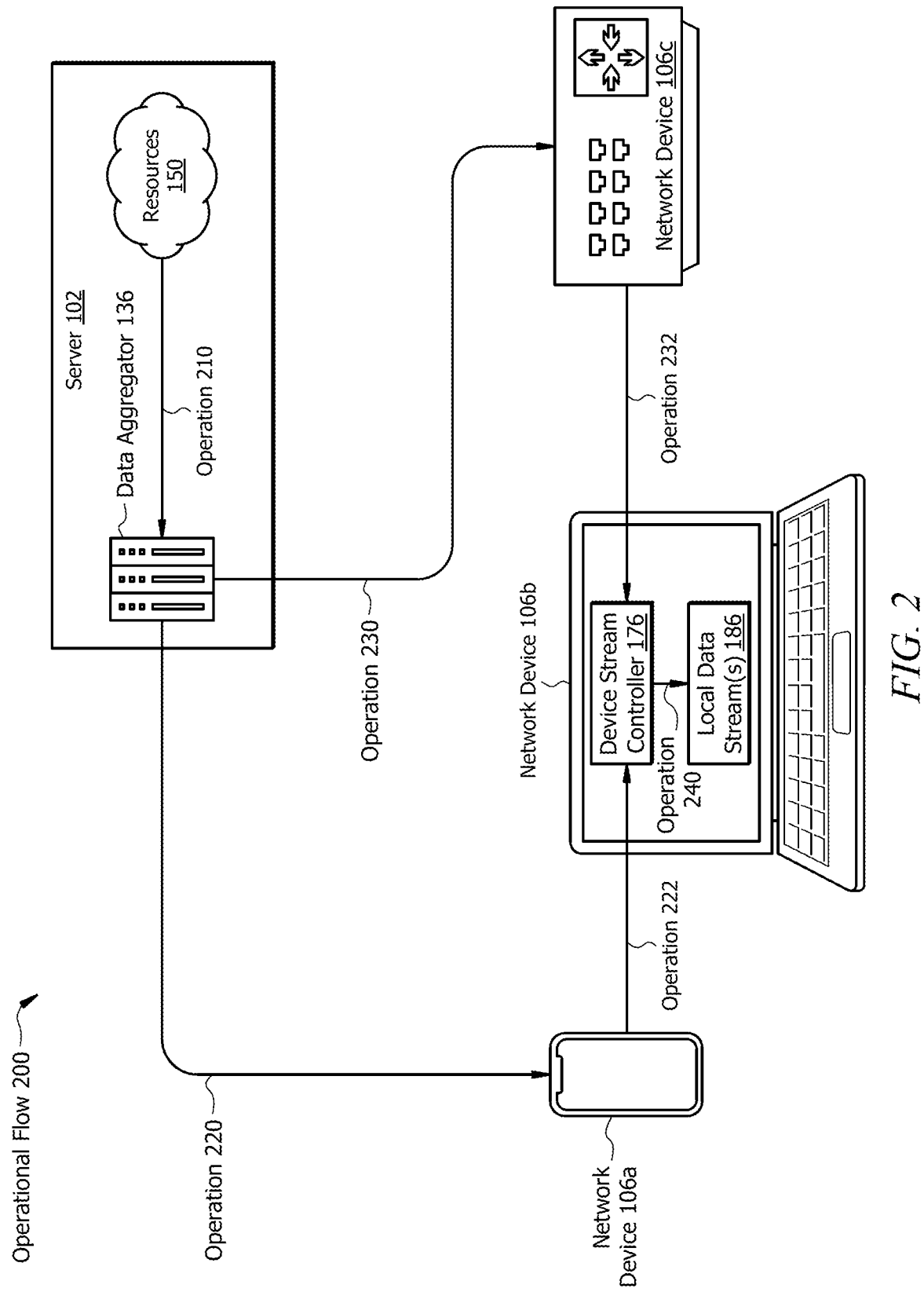
FIG. 2 illustrates an operational flow of the system of FIG. 1, according to one or more embodiments.
Figure 3:
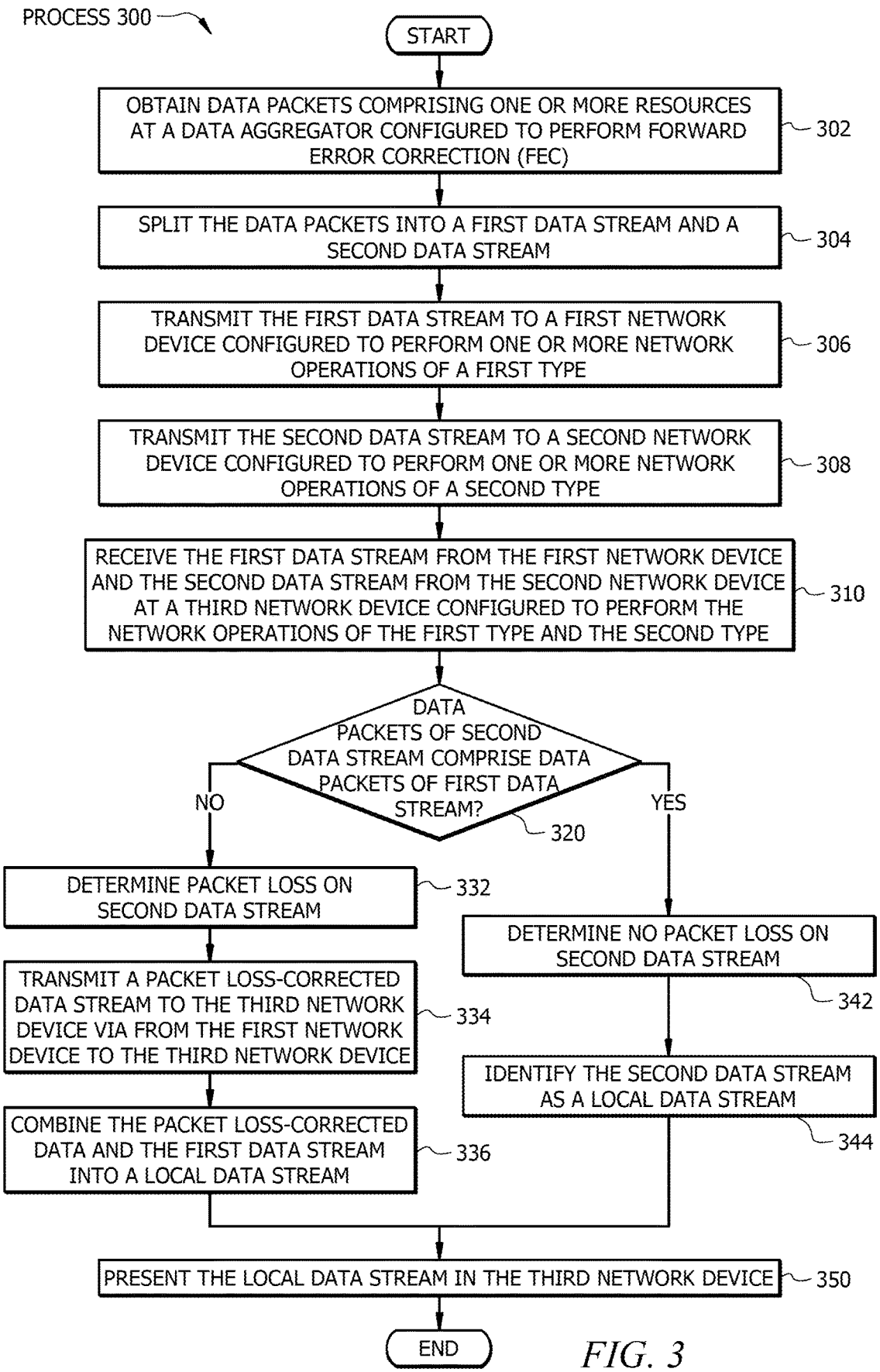
FIG. 3 illustrates a process for performing the operational flow of FIG. 2, according to one or more embodiments.
Figure 4:
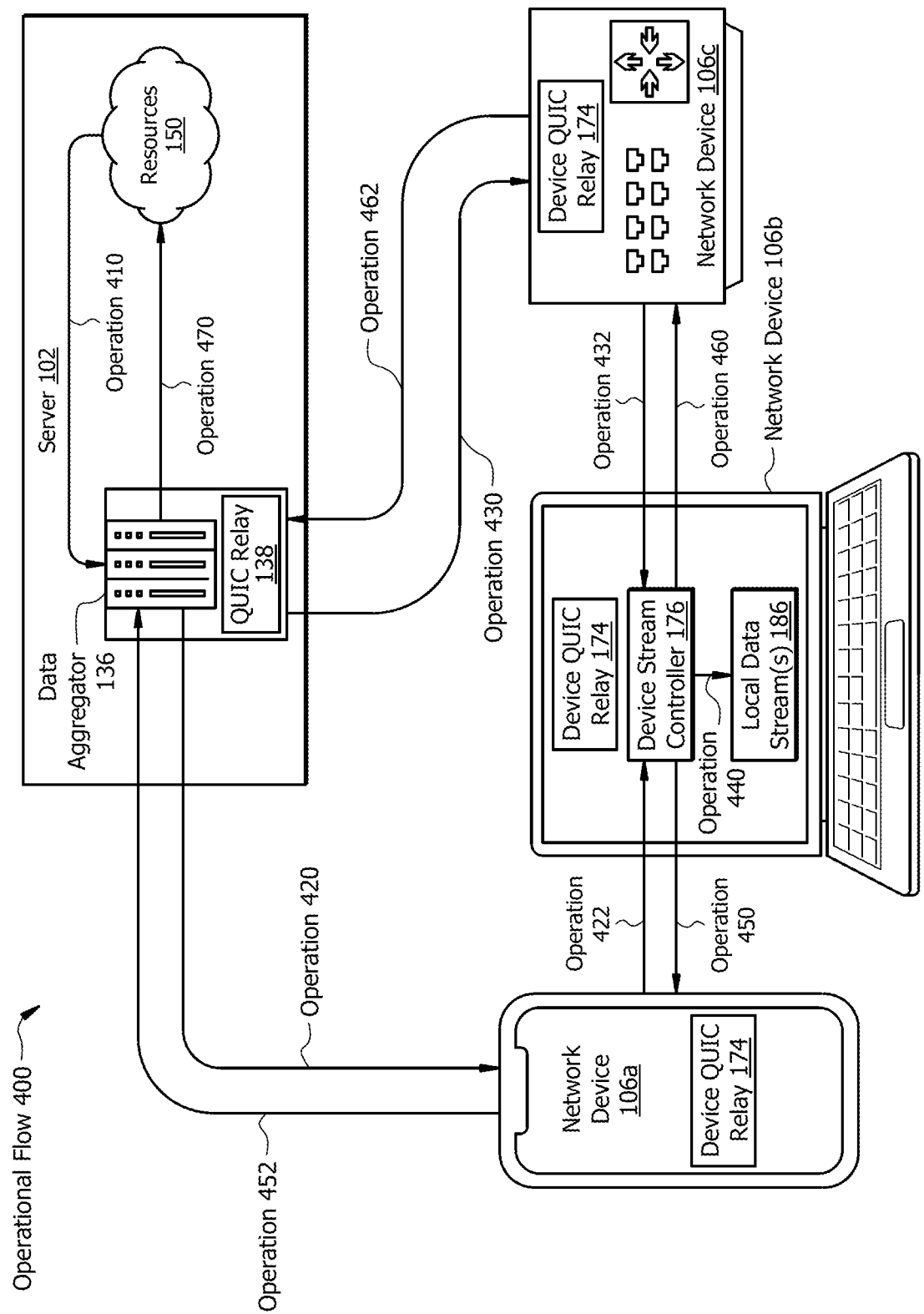
FIG. 4 illustrates an operational flow of the system of FIG. 1, according to one or more embodiments.
Figure 5:
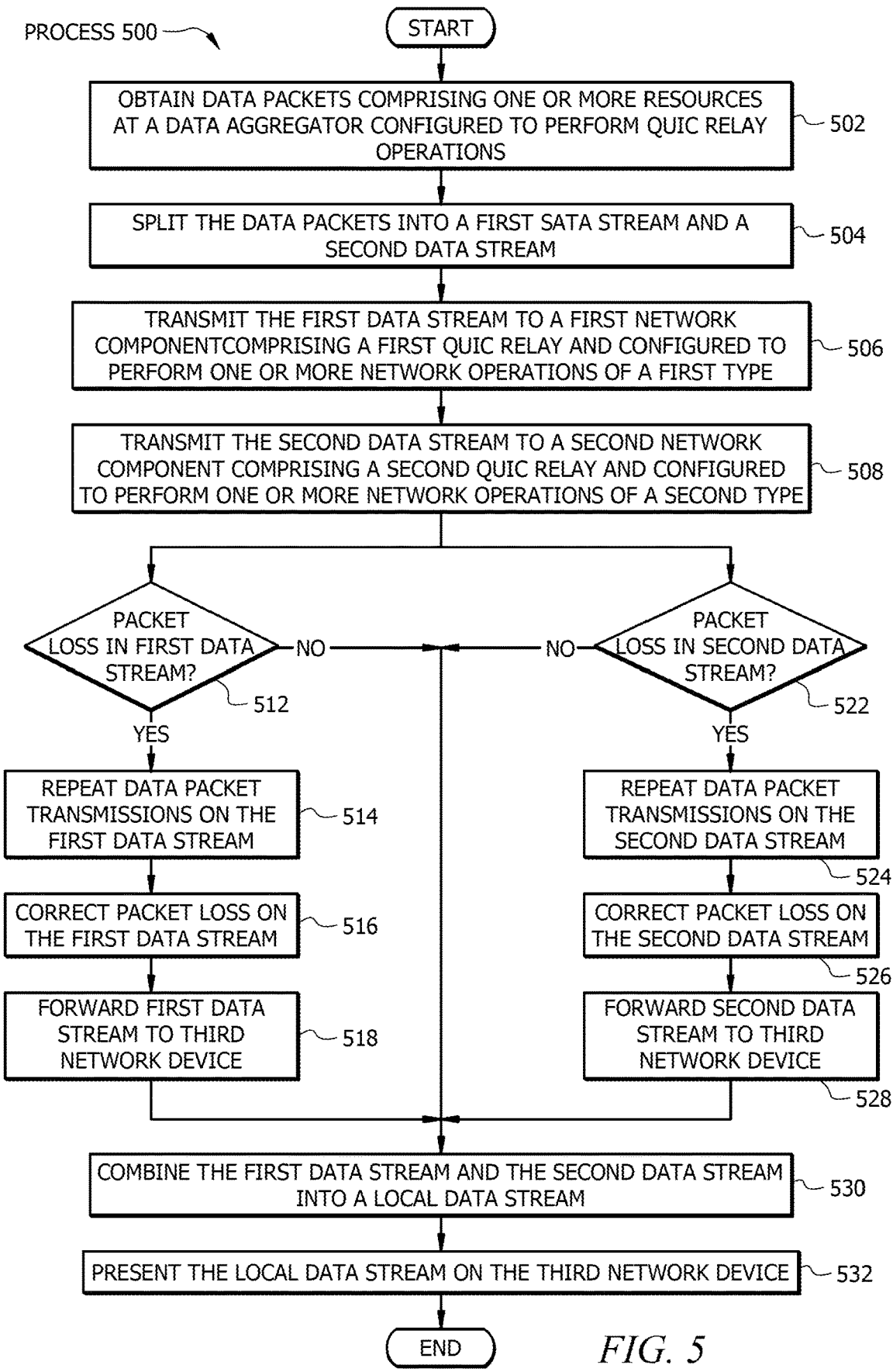
FIG. 5 illustrates a process for performing the operational flow of FIG. 4, according to one or more embodiments.
Figure 6:
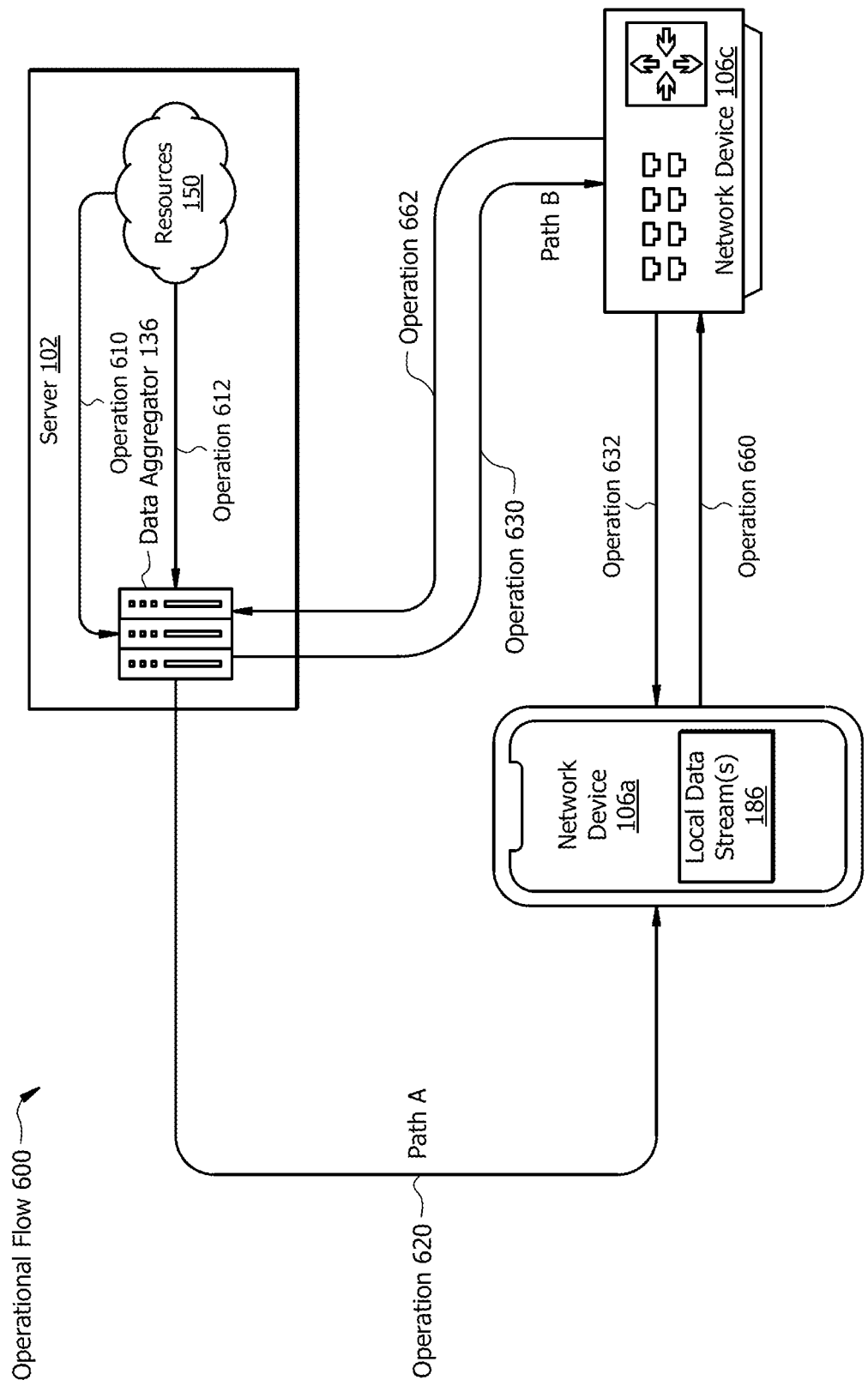
FIG. 6 illustrates an operational flow of the system of FIG. 1, according to one or more embodiments.
Figure 7:
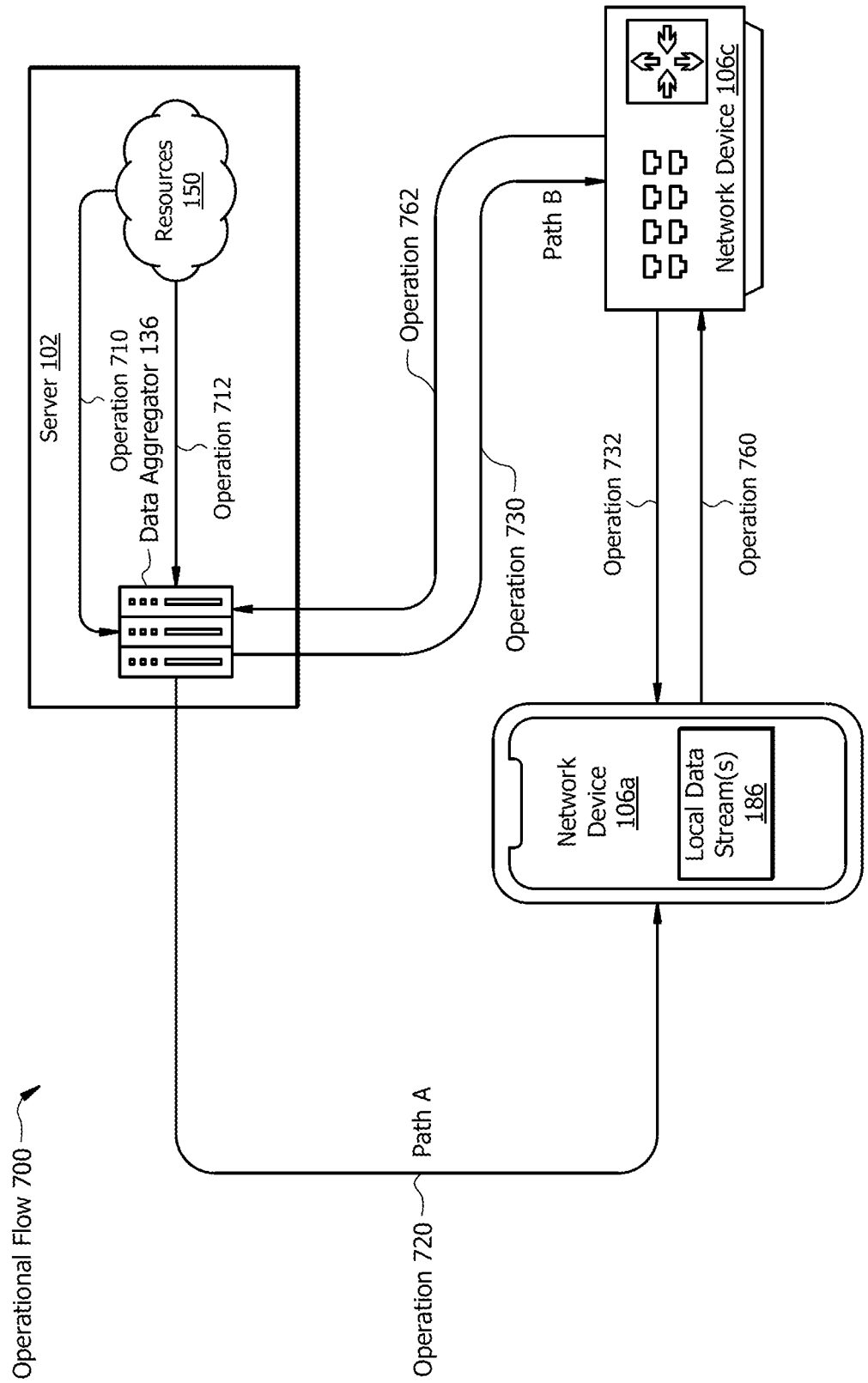
FIG. 7 illustrates an operational flow of the system of FIG. 1, according to one or more embodiments.
Figure 8:
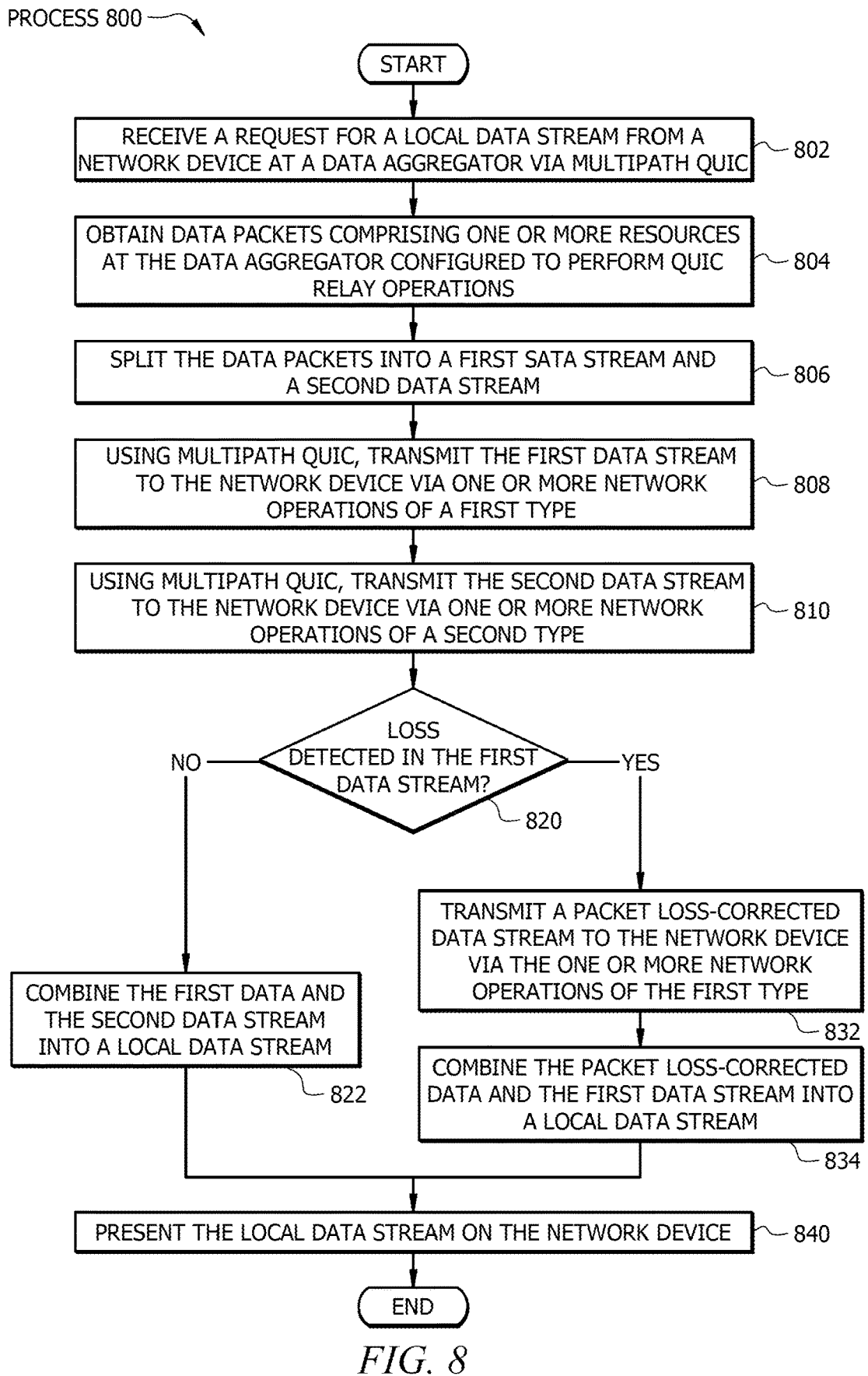
FIG. 8 illustrates a process for performing the operational flows of FIGS. 6 and 7, according to one or more embodiments.
Figure 9:
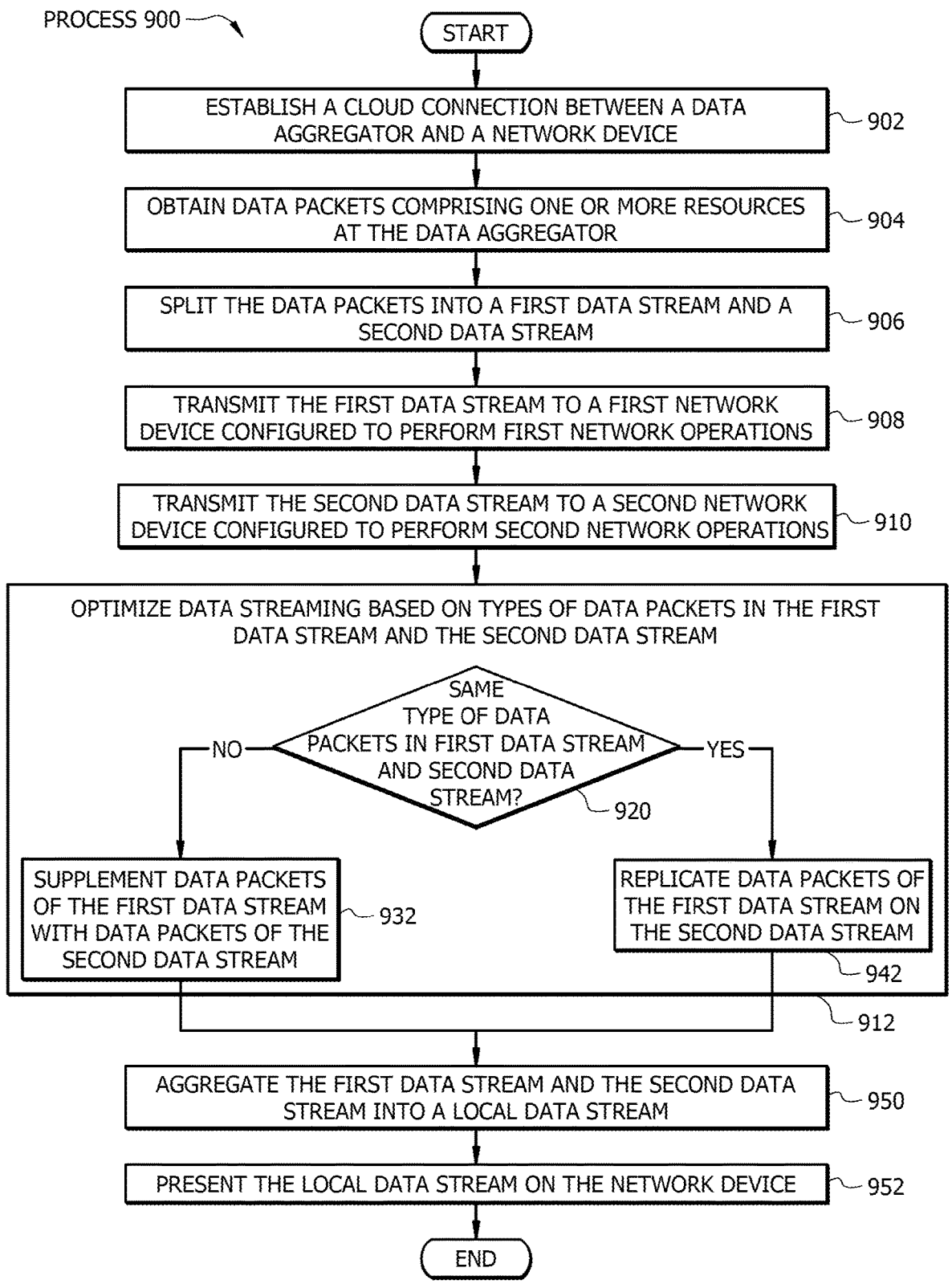
FIG. 9 illustrates a process performed by the system of FIG. 1, according to one or more embodiments.

This disclosure describes systems and methods to perform resilient data plane processing operations using multiple network streams. In particular, this disclosure provides various systems and methods to optimize data distribution operations over communication networks. FIG. 1 illustrates a system 100 in which a server 102 is configured to pride one or more data streams 104 to one or more network devices 106. FIG. 2 illustrates an operational flow 200 in which the server 102 of the system 100 of FIG. 1 performs operations 210-240. FIG. 3 illustrates a process 300 to perform the operational flow 200 of FIG. 2. FIG. 4 illustrates an operational flow 400 in which the server 102 of the system 100 of FIG. 1 performs operations 410-470. FIG. 5 illustrates a process 500 to perform the operational flow 400 of FIG. 4. FIG. 6 illustrates an operational flow 600 in which the server 102 of the system 100 of FIG. 1 performs operations 610-662. FIG. 7 illustrates an operational flow 700 in which the server 102 of the system 100 of FIG. 1 performs operations 710-762. FIG. 8 illustrates a process 800 to perform the operational flow 600 of FIG. 6 and the operational flow 700 of FIG. 7. FIG. 9 illustrates a process 900 to performed by the server 102 of the system 100 of FIG. 1.

FIG. 1 illustrates a system 100 configured to perform resilient data plane processing operations using multiple network streams. The system 100 comprises a server 102 communicably coupled to a network device 106a, a network device 106b, a network device 106c, a network device 106d, a network device 106e, a network device 106f, and a network device 106g (collectively, network devices 106) via a network 108. The network devices 106 may be grouped in one ore or more device groups 110a-110g (collectively, device groups 110) in accordance with corresponding locations, communication configuration, or organization policies. In FIG. 1, the server 102 is connected to the network 108 via a connection 112, the network devices 106a-106c in the device group 110a are connected to the network 108 via a connection 114a, and the network devices 106d-106g in the device group 110g are connected to the network 108 via a connection 114g. The device group 110a and the device group 110g are representative of multiple possible predefined device groups 110 in a space, distributed among multiple locations. The device groups 110 may be located in warehouses, assembly facilities, residential buildings, or private residences. The connection 114a and the connection 114g are representative of multiple possible connections 114. The device groups 110 may comprise multiple distinct or separate sub-groups. In some embodiments, the server 102 may be configured to perform resilient data plane processing operations using multiple data streams 104 at one or more network devices 106 in any of the device groups 110. The connection 112 and the connections 114 may be wired or wireless connections configured to enable communication between the server 102, the network 108, and the network devices 106. In other embodiments, the server 102 and the network 108 may be partially or completely located in a proximity of in the device groups 110 among the network devices 106.

In one or more embodiments, as a non-limiting example, the network devices 106 may be associated with one or more users (not shown). There may be multiple users or no users associated with the network devices 106. In some embodiments, the network devices 106 may be unassociated with any users and perform one or more roles completely autonomously from ongoing (e.g., constant) human management or intervention. For example, the network devices 106 may be videoconferencing devices in a conference room comprising one or more peripherals (e.g., displays or speakers). In some embodiments, some of the network devices 106 may be part of a sub-group of network devices 106. In an example, the network device 106a and the network device 106b may be associated with one another as communication nodes (e.g., acting as routers or anchor points) performing similar tasks such as routing connectivity signals in the device group 110a. In another example, the network device 106f and the network device 106g may be associated with one another as end points of a communication link where data streams 104 are exchanged between the network device 106f and the network device 106g.

In the example of FIG. 1, the device group 110a is shown comprising a network device 106a, a network device 106b, and a network device 106c. Further, the device group 110g is shown comprising a network device 106d, a network device 106e, a network device 106f, and a network device 106g. In this example, the device group 110a may be include the network devices 106 of an organization in a building, a device group 110b (implicitly referenced in the three dots between the device group 110a and the device group 110g) may include network devices 106 of an individual in an home, and the device group 110c (implicitly references in the three dots between the device group 110a and the device group 110g) may include devices 106 in a specific room of a building (e.g., a conference room). In another example, any of the device groups 110 include the network devices 106 associated with individuals in a specific department or sub-division of an organization.

In other embodiments, the server 102 may take any suitable physical form. As an example and not by way of limitation, the server 102 may be an embedded computer system, a system-on-chip (SOC), a single-board computer (SBC) system (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, a router device, or a combination of two or more of these. Where appropriate, the server 102 may include one or more computer systems, be unitary or distributed; span multiple locations; span multiple machines, span multiple data centers, or reside in a cloud, which may include one or more cloud components in one or more networks. Where appropriate, one or more computer systems may perform without substantial spatial or temporal limitation one or more operations of one or more methods described or illustrated herein. As an example, and not by way of limitation, the server 102 may perform in real-time or in batch mode one or more operations of one or more methods described or illustrated herein. The server 102 may perform at different times or at different locations one or more operations of one or more methods described or illustrated herein, where appropriate.

In one or more embodiments, the server 102 may comprise one or more server input (I)/output (O) interfaces 120 configured to perform one or more QUIC multipath operations 122, one or more server processors 124 comprising a server processing engine 126, a server stream controller 128 comprising a security chipset 130, a wireless chipset 132, and a routing chipset 134, a data aggregator 136, a QUIC relay 138, and a server memory 140. The server I/O interfaces 120 may comprise hardware, software executed by software, or a combination of both, providing one or more interfaces for communication between the server 102 and one or more I/O devices. The server 102 may include one or more of these I/O devices, where appropriate. One or more of these I/O devices may enable communication between a person and the server 102. As an example, and not by way of limitation, an I/O device may include a keyboard, keypad, microphone, monitor, mouse, printer, scanner, speaker, still camera, stylus, tablet, touch screen, trackball, video camera, another suitable I/O device, or a combination of two or more of these. An I/O device may include one or more sensors. This disclosure contemplates any suitable I/O devices and any corresponding suitable server I/O interfaces 120. Where appropriate, the server I/O interfaces 120 may include one or more device or software drivers enabling the one or more server processors 124 to drive one or more of these I/O devices. Although this disclosure describes and illustrates particular server I/O interfaces 120, this disclosure contemplates any suitable number of server I/O interfaces 120.

In one or more embodiments, the server I/O interfaces 120 may comprise a communication interface including hardware, software executed by hardware, or a combination of both providing one or more interfaces for communication (such as, for example, packet-based communication) between the server 102, the one or more network devices 106, the network 108, or one or more additional networks. As an example, and not by way of limitation, the communication interface of the server I/O interfaces 120 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable corresponding communication interface. As an example, and not by way of limitation, the server 102 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the network devices 106 may communicate with a wireless PAN (WPAN) (such as, for example, a Bluetooth WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. The server 102 may include any suitable communication interface for any of these networks, where appropriate. Although this disclosure describes and illustrates the server I/O interfaces 120 comprising particular communication interfaces, this disclosure contemplates any suitable communication interface.

In some embodiments, the server I/O interfaces 120 may comprise storage and databases communicatively coupled to the one or more server processors 124, the server stream controller 128, the data aggregator 136, a QUIC relay 138, and the server memory 140. The storage and databases may comprise wired connections that share an internal bandwidth for data packet transmissions inside the server 102 with the server memory 140. The storage and databases may be configured with a buffering capacity and a memory speed. The buffering capacity may indicate a buffering capacity (in bytes) that the storage and databases are capable of handling. For example, the buffering capacity may be 1,000 bytes. Further, the memory speed may indicate a processing speed (in bytes per second) at which the storage and databases is capable of handling or buffering data packets. For example, the memory speed may be 1,000 bytes per second. The storage and databases may comprise instructions and data memory for the one or more server processors 124.

In particular embodiments, the server I/O interfaces 120 may comprise a transceiver (e.g., transmitter, receiver, or a combination of both) configured to implement one or more wireless or wired connectivity protocols. In this regard, the transceiver may comprise antennas comprising hardware configured to establish one or more communication links (e.g., established via the connection 112 or the connections 114) between the server 102 and one or more of the network devices 106. Although this disclosure describes and illustrates the connection 112 and the connections 114, this disclosure contemplates any arrangement of channels for information exchange.

In other embodiments, the server I/O interfaces 120 may comprise an interconnect including hardware configured to connect the one or more server processors 124, the server stream controller 128, the data aggregator 136, the QUIC relay 138, and the server memory 140. As an example and not by way of limitation, the interconnect may include an Accelerated Graphics Port (AGP) or a graphics bus, an Enhanced Industry Standard Architecture (EISA) bus, a front-side bus (FSB), a HyperTransport (HT) interconnect, an Industry Standard Architecture (ISA) bus, an InfiniBand interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these.

The QUIC multipath operations 122 may be an extension to a QUIC protocol that enables hosts to exchange data over multiple networks over a single connection. The QUIC multipath operations 122 may be configured to perform traffic analysis on one or more of the data streams 104. The QUIC multipath operations 122 may be monitoring operations configured to study and/or evaluate information in the data packets contained in one or more of the data streams 104. The QUIC multipath operations 122 may enable multiplexing of data streams 104 over the connection 112 or one of the connections 114. In some embodiments, the QUIC multipath operations 122 may comprise convert a single QUIC connection into multiple split connections following two separate paths. For example, a single QUIC connection may be split into a cellular connection following a fifth-generation (5G) protocol in accordance with the 3GPP standards and an internet connection over one or more WI-FI protocol connections.

In some embodiments, the one or more server processors 124 comprise hardware for executing instructions (e.g., instructions 142), such as those making up a computer program. As an example, and not by way of limitation, to execute instructions, the one or more server processors 124 may retrieve (or fetch) the instructions from an internal register, an internal cache, or the server memory 140; decode and execute them; and then write one or more results to an internal register, an internal cache, or the server memory 140. Specifically, the one or more server processors 124 may include one or more internal caches for data, instructions, or addresses. This disclosure contemplates the one or more server processors 124 including any suitable number of internal caches, where appropriate. As an example, and not by way of limitation, the one or more server processors 124 may include one or more instruction caches, one or more data caches, and one or more translation lookaside buffers (TLBs). Instructions in the instruction caches may be copies of instructions 142 in the server memory 140, and the instruction caches may speed up retrieval of those instructions by the one or more server processors 124. Data in the data caches may be copies of data in the server memory 140 for instructions executing at the one or more server processors 124 to operate on via one or more server processing engines 126; the results of previous instructions executed at the one or more server processors 124 for access by subsequent instructions executing at the one or more server processors 124 or for writing to the server memory 140, or other suitable data. The data caches may speed up read or write operations by the one or more server processors 124. The TLBs may speed up virtual-address translation for the one or more server processors 124. In particular embodiments, the one or more server processors 124 may include one or more internal registers for data, instructions, or addresses. This disclosure contemplates the one or more server processors 124 including any suitable number of suitable internal registers, where appropriate. Where appropriate, the one or more server processors 124 may include one or more arithmetic logic units (ALUs); be a multi-core processor; or include one or more additional one or more server processors 124. Although this disclosure describes and illustrates a particular processor, this disclosure contemplates any suitable processor.

In one or more embodiments, the one or more server processors 124 include hardware, software executed by hardware, or a combination of both, configured to reprovision the network devices 106 to perform one or more tasks in the device groups 110. In some embodiments, the one or more server processors 124 are configured to determine communication reciprocity for a specific network device 106 within a specific device group 110. The one or more server processors 124 may be a routing devices configured to route resources in the network 108 to additional network devices 106. In some embodiments, the one or more server processors 124 may be included on a same card or die. In this regard, the one or more server processors 124 may be configured to determine types of data exchanged by the network devices 106. The types of data may comprise sound, video, or informational details associated with any of the network devices 106.

In other embodiments, the processing engine 126 may be software executed by hardware and configured to dynamically aid the network devices 106 to maintain synchronization parameters during synchronization operations. The processing engine 126 may be implemented by the one or more server processors 124 operating as specialized hardware accelerators. The processing engine 126 may be configured to implement networking-specific processing tasks in custom logic and achieve better performance than typical software implementations. For example, the processing engine 126 may be lookup engines (e.g., using specialized logic), cryptographic coprocessors, content inspection engines, and the like. In some embodiments, the one or more processing engines configured to operate the server stream controller 128 via execution of one or more of the instructions 142.

In one or more embodiments, the server stream controller 128 is hardware, software executed by hardware, or a combination of both configured to regulate the types of data shared among two or more of the network devices 106. In some embodiments, the server 102 may assist in establishing a communication link (examples shown in reference to FIGS. 2, 4, 6, and 7) between any two or more network devices 106. In implementing the communication links, the server 102 may monitor data shared by each of the network devices 106 and control that specific types of data are reciprocated to at least one of the network devices 106. In this regard, the server stream controller 128 may regulate the types of data presented at a given network device 106 based at least in part upon the types of data that the given network device is configured to share. In some embodiments, the server stream controller 128 may be configured to schedule timings for transmissions of multiple network devices 106 to evaluate the data transmitted. In other embodiments, the server stream controller 128 may be configured to determine multiple data exchange settings (e.g., communication preferences 148 of a given network device 106) and determine whether the given network device 106 is configured to share a specific type of data. The server stream controller 128 may comprise the security chipset 130 configured to establish one or more physical gates/firewalls at the server 102 or at one or more of the network devices 106, the wireless chipset 132 configured to provide wireless connectivity capabilities, and the routing chipset 134 configured to regulate data exchanging capabilities by reducing or increasing access to specific types of data. In other embodiments, the security chipset 130, the wireless chipset 132, and the routing chipset 134 may be combined into a same chipset sharing common memory resources and processing resources.

In one or more embodiments, the data aggregator 136 may be a standalone device separate from the server 102 and/or a part of the server 102. The data aggregator 136 may be configured to gather and summarize data. The data aggregator 136 may be configured to perform one or more splitting operations that comprise separating a data stream 104 into one or more data streams 104. The data aggregator 136 may be configured to access and examine large amounts of data in a predefined and/or dynamically modified time frame. For example, a row of aggregate data may represent hundreds, thousands or even more data records. The data aggregator 136 may collect data from one or more resources 150, provides some value-added processing, and repackages the results in a usable form. The data aggregator 136 may be configured to perform one or more operations associated with a virtual private network (VPN) concentrator. In this regard, the data aggregator 136 may be a hardware networking device that creates multiple, simultaneous VPN connections to a same network. The data aggregator 136 may allow individuals in different locations to access a network. The data aggregator 136 may create multiple encrypted tunnels that secure internet traffic over a network, with a possibility of creating multiple VPN tunnels for a single network. In some embodiments, the data aggregator 136 may encrypt and/or decrypt data exchanged over a network, assign communication addresses to users, and authenticate users accessing a network. The data aggregator 136 may be configured to combine and/or aggregate of multiple network connections in parallel. The data aggregator 136 may be configured to increase a total throughput beyond what a single connection may sustain, and provide redundancy in a network.

The QUIC relay 138 may be media over QUIC (MoQ) relay installed in access points throughout data transportation. The QUIC relay 138 may aid in repairing packet loss, so that any packet losses are repaired at a given endpoint while data is traveling in at least two different pathways (e.g., transferring high-bandwidth and low-bandwidth content). In some embodiments, the QUIC relay 138 may develop low-latency media delivery solutions for ingest and distribution of media. The QUIC relay 138 may be configured to handle data streams 104 comprising one or more media formats and/or one or more data rates. The QUIC relay 138 may be configured to provide one or more solutions that authenticate to another relay or the server to transmit or receive data streams 104. The data streams 104 may be encrypted at a transport layer using one or more QUIC mechanisms. The content in data packets of the data streams 104 may be end-to-end encrypted in certain use cases, where end-to-end keys are available to media sources and network devices 106.

In one or more embodiments, the server memory 140 includes mass storage for data or instructions. As an example, and not by way of limitation, the server memory 140 may include a hard disk drive (HDD), a floppy disk drive, flash memory, an optical disc, a magneto-optical disc, magnetic tape, or a Universal Serial Bus (USB) drive or a combination of two or more of these. The server memory 140 may include removable or non-removable (or fixed) media, where appropriate. The server memory 140 may be internal or external to a computer system, where appropriate. In particular embodiments, the server memory 140 is non-volatile, solid-state memory. In particular embodiments, the server memory 140 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates the server memory 140 as a mass storage taking any suitable physical form. The server memory 140 may include one or more storage control units facilitating communication between the one or more server processors 124 and the server memory 140, where appropriate. Although this disclosure describes and illustrates particular storage, this disclosure contemplates any suitable storage.

In one or more embodiments, the server memory 140 includes a main memory for storing the instructions 142 for the one or more server processors 124 to execute or data for the one or more server processors 124 to operate on. As an example, and not by way of limitation, the network devices 106 may load the instructions 142 from another memory in the network devices 106. The one or more server processors 124 may then load the instructions 142 from the server memory 140 to an internal register or internal cache. To execute the instructions 142, the one or more server processors 124 may retrieve the instructions 142 from the internal register or internal cache and decode them. During or after execution of the instructions 142, the one or more server processors 124 may write one or more results (which may be intermediate or final results) to the internal register or internal cache. The one or more server processors 124 may then write one or more of those results to the server memory 140. In some embodiments, the one or more server processors 124 executes only the instructions 142 in one or more internal registers or internal caches or in the server memory 140 and operates only on data in one or more internal registers or internal caches or in the server memory 140.

In one or more embodiments, the server memory 140 includes commands or data associated with one or more specific applications in addition or as part of the instructions 142. In FIG. 1, the server memory 140 comprises the instructions 142, one or more network device profiles 144 comprising one or more entitlements 146 associated with one or more communication preferences 148, one or more cloud resources 150, one or more data streams 104, one or more data types 152 indicating types of data in the data streams 104 and multiple communication parameters 154. The one or more network device profiles 144 may comprise the one or more entitlements 146 and one or more communication preferences 148. The one or more network device profiles 144 may be configured to provide access to configuration parameters for the network devices 106 to operate (e.g., perform one or more tasks) in the device groups 110. The entitlements 146 may be configured to provide one or more connectivity allowances to the network devices 106 in the device groups 110. For example, in accordance with one of the device profiles 144 corresponding to the network device 106b, the network device 106b may be a desktop computer or communication terminal configured to communicate and route signaling among some of the additional network devices 106. In this regard, the entitlements 146 associated with a corresponding network device profile 144 of the network device 106b may indicate that the network device 106b is allowed to communicate with one or more components in the network 108 (e.g., core network components or servers comprising specific network functions (NF)) to communicate and route signaling.

In one or more embodiments, the communication preferences 148 may be procedure or operational guidelines predefined by one or more organizations associated with the server 102. The communication preferences 148 may comprise information associated with or updated by the network devices 106. The communication preferences 148 may be predefined data exchange parameters set in accordance with one or more organization rules and policies. For example, an organization may predefine in the communication preferences 148 of a given device profile 144 that a given network device 106 is configured to exchange both video and sound during a communication exchange. Further, the communication preferences 148 may be dynamically modified data exchange parameters by a user associated with a given network device. For example, a user may set the communication preferences 148 to transmit specific data types during a communication exchange. In some embodiments, the resources 107 may be cloud resources, power resources, memory resources, and processing resources that are consumed in attempts to access services in a given communication system 100. In other embodiments, the resources 150 may be audio, visual, and/or sound data configured to be packaged as data streamed for playback.

In one or more embodiments, the data types 152 may include classification of one or more different types of data. The data types 152 may include audio data, visual data, or configuration data among others. The data types 152 may be classified from data packets in one or more of the data streams 104. The multiple data types 152 are further described in reference to the operational flow 200 of FIG. 2, the operational flow 400 of FIG. 4, the operational flow 600 of FIG. 6, and the operational flow 700 of FIG. 7. In FIG. 1, the data streams 104 include a data stream 104a, a data stream 104b, and a data stream 104c among others. As shown by the consecutive dots, there may be several additional data streams 104 associated with one or more network devices 106. In some embodiments, the communication parameters 154 may include one or more configuration settings configured to modify at least one of the data streams 104. The data streams 104 may be received by the server 102 via the connection 112. In some embodiments, the communication parameters 154 may be actively (e.g., dynamically or immediately) or passively (e.g., updated over time) modified by the server 102. The data streams 104 may include a stream corresponding to each network device 106 in a common communication event. A communication event may be a data exchange event such as a videoconference event comprising exchanging sound and video between two or more network devices 106. In some embodiments, the communication parameters 154 may be configured to modify one of the data streams 104.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), random access memory (RAM)-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In one or more embodiments, the network 108 may be a combination of electronic devices forming a multi-node mesh. As an example, and not by way of limitation, one or more portions of the network 108 may include an ad hoc network, an intranet, an extranet, a virtual private network (VPN), a LAN, a wireless LAN (WLAN), a WAN, a wireless WAN (WWAN), a MAN, a portion of the Internet, a portion of the Public Switched Telephone Network (PSTN), a cellular technology-based network, a satellite communications technology-based network, another network 108, or a combination of two or more such networks.

In one or more embodiments, any one of the device groups 110 may comprise thousands of network devices 106 exchanging data with one another simultaneously, in accordance with their respective device groups 110, or in accordance with one or more sub-groups of network devices 106. Referring to the network device 106a as a non-limiting example, the network devices 106 may comprise one or more device I/O interfaces 170 configured to perform one or more device QUIC multipath operations 172, a device QUIC relay 174, a device stream controller 176, a device processor 178 comprising a device processing engine 180, and a device memory 182 comprising one or more instructions 184, one or more local data streams 186, a local profile 188, and one or more network operations 190. In one or more embodiments, the one or more network devices 106 include end-network devices such as laptops, phones, tablets, and any other suitable device that are capable of receiving, creating, processing, storing, or communicating information, including data packet transmissions. In some embodiments, the network devices 106 represents client devices or network devices that are capable of receiving real-time data packet transmissions and may include general purpose computing devices (e.g., servers, workstations, desktop computers, and the like), mobile computing devices (e.g., laptops, tablets, mobile phones, and the like), wearable devices (e.g., watches, glasses, or other head-mounted displays (HMDs), car devices, and the like), and so forth.

The device I/O interfaces 170 may be configured to perform one or more of the operations described in reference to the server I/O interfaces 120. Fr example, the server I/O interfaces 120 may be configured to perform one or more device QUIC multipath operations 172 that may be one or more of the QUIC multipath operations described in reference to the server I/O interfaces 120. In one or more embodiments, the device QUIC relay 174 may be configured to perform one or more of the operations described in reference to the QUIC relay 138 described in reference to the server 102.

In some embodiments, the device stream controller 176 may be configured to perform one or more of the operations described in reference to the server stream controller 128 described in reference to the server 102. The server stream controller 128 may be configured to consolidate two or more of the data streams 104 received at the network device 106a.

The device processor 178 may be configured to perform one or more of the operations described in reference to the one or more server processors 124, the device processing engine 180 may be configured to perform one or more of the operations described in reference to the server processing engine 126, and the device memory 182 may be configured to perform one or more of the operations described in reference to the server memory 140. In some embodiments, the instructions 184 may be used to perform one or more of the operations described in reference to the instructions 142. The local data streams 186 may be streams of data received by the network device 106a from the server 102 or one or more additional network devices 106. The local data streams 186 may be a combination of data packets received from two of the data streams 104. The local data streams 186 may be aggregated versions of two or more of the data streams 104. In some embodiments, the local data streams 186 may be one or more reconstructions of data previously split by the data aggregator 136.

The local profile 188 may include information that identify the network device 106A in data exchanges over the network 108. In this regard, the local profile 188 may provide the server 102 and other network devices 106 with access information to exchange corresponding streams of data. For example, the local profile 188 may be interpreted by the server 102 as one of the device profiles 144. The network operations 190 may be similar to those described in reference to the security chipset 130, the wireless chipset 132, and/or the routing chipset 134. The network operations 190 may be one or more internet communications and/or one or more cellular communications.

FIG. 2 shows respective examples of the operational flow 200, in accordance with one or more embodiments. In particular, FIG. 2 illustrates a first example of the system 100 configured to optimize streaming of aggregated data. The system 100 includes the server 102 communicatively coupled to the network device 106a, the network device 106b, and the network device 106c. In some embodiments, while network devices 106a-106c are shown in communication with one another, fewer or more network devices 106 may be configured as intermediate nodes between the server 102 and the network device 106b. Further, while the server 102 is shown comprising the data aggregator 136 and the resources 150, the data aggregator 136 may be at a stand-alone location separate to that of the server 102.

In one or more embodiments, the data aggregator 136 may comprise cellular connectivity capabilities and internet connectivity capabilities, the network device 106a may comprise at least cellular capabilities, the network device 106b may comprise cellular connectivity capabilities and internet connectivity capabilities, and the network device 106c may comprise at least internet capabilities.

The system 100 may be configured to perform one or more publishing operations and/or subscribing operations. The data aggregator 136 may be a link aggregator or a VPN concentrator. The resources 150 may be part of one or more WebEx cloud applications or services coupled to the data aggregator 136 via one or more communication links. The network device 106a and the network device 106c may be hardware and/or software (executed by hardware) configured to perform one or more operations associated with user-facing devices.

In the example of FIG. 2, the system 100 performs operations 210-240 in which the system 100 optimizes streaming of aggregated video (e.g., visual data). At operation 210, the data aggregator 136 is configured to receive high-definition (HD) video data streams 104 from the resources 150. At operation 220, the data aggregator 136 may be configured to transmit one or more data parity data streams 104 to the network device 106a over a cellular network. At operation 222, the network device 106a transmits the video parity data stream 104 from the operation 220 to the network devices 106 over wireless technologies (e.g., Bluetooth™, WI-FI, or ultrasound technologies). At operation 230, the data aggregator 136 may be configured to transmit one or more HD video data streams 104 to the network device 106c over a network with an internet connection. At operation 232, the network device 106c may transmit the HD video data stream 104 from operation 230 to the network device 106b over another network connection (e.g., WI-FI). The network device 106b may render an error-corrected video stream based on the video parity data stream 104 received from operation 222 and the HD video data stream 104 received from operation 232. While FIG. 2 describes transmission of video data streams 104, the system 100 may comprise transmission of one or more data types 152. The data types 152 may be different types of a same data (e.g., video transmitted at different resolution levels or in different protocols) or different data types 152 altogether (e.g., visual data comprising image data or text data, sound data, and the like).

In the illustrated embodiment of FIG. 2, the system 100 comprises a model that utilizes the device stream controller 176 in the network device 106b to repair packet losses and provide high-quality media data streams 104 as one or more local data streams 186, regardless of a quality of a network connection. In one or more embodiments, the resources 150 may send data packets to the data aggregator 136, where a Forward Error Correction (FEC) may take place. At operation 220, the video parity streamed over the cellular network may comprise small amounts of data sent to the network device 106a. In some embodiments, the network device 106a may comprise a network connectivity service (e.g., application such as AnyConnect™) configured to aggregate routing of data packets received over cellular networks and/or internet networks. In some embodiments, lost packets at the network device 106b may be corrected during the operation 222. At operation 230, the data aggregator 136 may be configured to transmit data packets to the network device 106c. At operation 232, the packets may be lost between the network device 106c and the network device 106b. At operation 222, the network device 106a may transmit a packet loss-corrected stream to the network device 106b over a network connection different from the network communication of the operation 232. At operation 240, the network device 106b may be configured to repair the data streams received at operation 232 with any of the parity data streams 104 received over the operation 222. At this stage, the network device 106b may send the repaired data stream 104 to a data rendering service (e.g., video rendering application, such as a local WebEx application) in which a corresponding user may be presented with higher-quality media.

In one or more embodiments, the data aggregator 136 splits the HD video data stream 104 received from the resources 150. The data aggregator 136 may send one copy of the HD video data stream 104 to the network device 106b via the network device 106c and a parity data stream 104 to the network device 106b via the network device 106a. The network device 106b may be configured to correct code associated with packet drops during the operation 240 with data packets from the parity stream received during the operation 232.

In some embodiments, the data streams 104 transmitted via the operation 220 and the operation 222 may comprise a lower bandwidth than the data streams 104 transmitted via the operation 230 and the operation 232.

FIG. 3 shows an example flowchart of a process 300 to perform resilient data plane processing operations using multiple data streams 104, in accordance with one or more embodiments. Modifications, additions, or omissions may be made to the process 300. The process 300 may include more, fewer, or other operations than those shown below. For example, operations may be performed in parallel or in any suitable order. While at times discussed as the server 102, the network devices 106, the server processor 124, the device stream controller 176, or components of any of thereof, any suitable system or components of the system 100 may perform one or more operations of the process 300. For example, one or more operations of the process 300 may be implemented, at least in part, in the form of software instructions 142 of FIG. 1, stored on a non-transitory computer readable medium, tangible, machine-readable media (e.g., the server memory 140 of FIG. 1) that when run by one or more processors (e.g., one or more server processors 124 of FIG. 1) may cause the one or more processors to perform the operations 302-350.

Referencing as a non-limiting example the operational flow 200 described in reference to FIG. 2, the process 300 may start at operation 302, where the data aggregator 136 obtains data packets comprising one or more resources 150. The data aggregator 136 may be configured to perform one or more FEC operations. At operation 304, the data aggregator 136 is configured to split the data packets into a data stream 104a and a data stream 104b. At operation 306, the data aggregator 136 is configured to transmit the data stream 104a to the network device 106a configured to perform one or more network operations of a first type. At operation 308, the data aggregator 136 is configured to transmit the data stream 104b to the network device 106c configured to perform one or more network operations of a second type. At operation 310, the network device 106b receives the data stream 104a from the network device 106a and the data stream 104b from the network device 106c.

The process 300 continues at operation 320, where the network device 106b determines whether the data packets of the data stream 104b comprise the data packets of the data stream 104a. Herein, the network device 106b determines whether a HD video stream received over WI-FI in the operation 252 is received in burst loss transmission when the video parity stream received over other network operations in the operation 222. If the network device 106b determines that the data packets of the data stream 104b does not comprise the data packets of the data stream 104a (e.g., NO), then the process 300 continues to operation 332. If the network device 106b determines that the data packets of the data stream 104*b* comprise the data packets of the data stream 104*a* (e.g., YES), then the process 300 proceeds to operation 342.

At operation 332, the network device 106*b* determines packet losses on the data stream 104*b*. At operation 334, the data aggregator 136 transmits a packet loss-corrected data stream 104*c* to the network device 106*b* via the network device 106*a*. At operation 336, the network device 106*b* combines the packet loss-corrected data stream 104*c* and the data stream 104*b* into a local data stream 186. At operation 342, the network device 106*b* determines that no packet loss is found on the data stream 104*b*. At operation 344, the network device 106*b* identifies the data stream 104*b* as the local data stream 186. The local data stream 186 being configured for playback at the network device 106*b*.

In some embodiments, the process 300 ends at operation 350, where the network device 106*b* presents the local data stream 186 for playback.

FIG. 4 show respective examples of the operational flow 400, in accordance with one or more embodiments. In particular, FIG. 4 illustrates a second example of the system 100 configured to optimize streaming of aggregated data. The system 100 includes the server 102 communicatively coupled to the network device 106*a*, the network device 106*b*, and the network device 106*c*. In some embodiments, while network devices 106*a*-106*c* are shown in communication with one another, fewer or more network devices 106 may be configured as intermediate nodes between the server 102 and the network device 106*b*. Further, while the server 102 is shown comprising the data aggregator 136 and the resources 150, the data aggregator 136 may be at a standalone location separate to that of the server 102.

In one or more embodiments, the data aggregator 136 may comprise cellular connectivity capabilities and internet connectivity capabilities, the network device 106*a* may comprise at least cellular capabilities, the network device 106*b* may comprise cellular connectivity capabilities and internet connectivity capabilities, and the network device 106*c* may comprise at least internet capabilities.

The system 100 may be configured to perform one or more publishing operations and/or subscribing operations. The data aggregator 136 may be a link aggregator or a VPN concentrator. The resources 150 may be part of one or more WebEx cloud applications or services coupled to the data aggregator 136 via one or more communication links. The network device 106*a* and the network device 106*c* may be hardware and/or software (executed by hardware) configured to perform one or more operations associated with user-facing devices. The system 100 may be configured to perform one or more publishing operations and/or subscribing operations. The data aggregator 136 may be a link aggregation or a VPN concentrator comprising a Masque Media Over QUIC (MoQ) Edge Relay. The MoQ may be a live media delivery protocol utilizing QUIC data streams 104. The QUIC is a transport layer network protocol configured to multiplex data between connections.

In the example of FIG. 4, the system 100 performs operations 410-470 in which the system 100 optimizes streaming of aggregated video (e.g., visual data). At operation 410 and operation 470, the data aggregator 136 is configured to exchange high-bandwidth/low-bandwidth video over the MoQ with the resources 150. At operation 420, the data aggregator 136 may be configured to transmit lower-bandwidth video over the MoQ over a cellular network (e.g., a 5G connection). At operation 430, the data aggregator 136 may be configured to transmit higher-bandwidth video over a corresponding QUIC relay 138 to a corresponding device QUIC relay 174 of the network device 106*c*. At operation 470, the resources 150 may be configured to exchange higher-bandwidth/lower-bandwidth video over the MoQ with the data aggregator 136. At operation 252, the network device 106*a* may be configured to subscribe lower-bandwidth video from the data aggregator 136. At operation 422, the network device 106*a* may be configured to transmit lower-bandwidth video over the MoQ over a network connection. At operation 450, the network device 106*b* may subscribe lower-bandwidth video from the network device 106*a*. At operation 460, the network device 106*b* may subscribe higher-bandwidth video from the network device 106*c*. At operation 432, the network device 106*c* transmits higher-bandwidth video over the MoQ over a network connection. At operation 462, the network device 106*c* may be configured to subscribe higher-bandwidth video over the device QUIC relay 174 to the data aggregator 136. The network device 106*b* may render a best quality video stream based on the lower-bandwidth video and the higher-bandwidth video.

In some embodiments, while FIG. 4 describes transmission of video streams, the system 100 may comprise transmission of one or more data types. The data types 152 may be different types of a same data (e.g., video transmitted at different resolution levels or in different protocols) or different data types 152 altogether (e.g., visual data comprising image data or text data, sound data, and the like).

In the illustrated embodiment of FIG. 4, the MoQ relays (e.g., indicated by the QUIC relay 138 and the device QUIC relays 174) installed in access points throughout the data transportation aid in repairing packet losses such that data is enabled to travel in multiple pathways. While data is traveling two different pathways (e.g., transferring high-bandwidth and low-bandwidth content), any packet losses may be repaired at a final MoQ relay in the network device 106*b*. At this stage, the best quality data stream (e.g., in a higher-fidelity format) may be presented in the network device 106*b*.

In certain embodiments, using the protocol MoQ, which follows a publish-subscribe model, a user may request content on the network device 106*b*. The request may go in two directions: 1) one request for higher-bandwidth content through the network device 106*c*; and 2) another request through a nearby Bluetooth™ connection to the network device 106*a* and uses cellular connectivity to complete the request with the data aggregator 136. Both data streams 104 may arrive at the data aggregator 136, which requests and receives data from a server associated with the resources 150. The data travels both ways back to the network device 106*b* and arrives in high quality at the network device 106*b* because packet repair may happen along both directions.

In one or more embodiments, the requests may be higher-bandwidth requests or lower-bandwidth requests. In the system 100, the network device 106*b* may request specific data types 152 that complement a best version of the streamed data. For example, the network device 106*b* may only request FEC for sound data to be received from network device 106*a* while receiving visual data from the network device 106*c*. While FIG. 4 shows that the MoQ protocol is used, any sort of subscribe-publish protocol may be implemented. Further, any operations to request various media streams on different paths may be implemented. In some embodiments the relays may be discovered dynamically or periodically.

FIG. 5 shows an example flowchart of a process 500 to perform resilient data plane processing operations using multiple data streams 104, in accordance with one or more embodiments. Modifications, additions, or omissions may be made to the process 500. The process 500 may include more, fewer, or other operations than those shown below. For example, operations may be performed in parallel or in any suitable order. While at times discussed as the server 102, the network devices 106, the server processor 124, the device stream controller 176, or components of any of thereof, any suitable system or components of the system 100 may perform one or more operations of the process 500. For example, one or more operations of the process 500 may be implemented, at least in part, in the form of software instructions 142 of FIG. 1, stored on a non-transitory computer readable medium, tangible, machine-readable media (e.g., the server memory 140 of FIG. 1) that when run by one or more processors (e.g., one or more server processors 124 of FIG. 1) may cause the one or more processors to perform the operations 502-532.

Referencing as a non-limiting example the operational flow 400 described in reference to FIG. 4, the process 500 may start at operation 502, where the data aggregator 136 obtains data packets comprising one or more resources 150. The data aggregator 136 may comprise the QUIC relay 138 configured to perform one or more QUIC relay operations. At operation 504, the data aggregator 136 is configured to split the data packets into a data stream 104a and a data stream 104b. At operation 506, the data aggregator 136 is configured to transmit the data stream 104a to the network device 106a comprising a first device QUIC relay 174 configured to perform one or more network operations of a first type. At operation 508, the data aggregator 136 is configured to transmit the data stream 104b to the network device 106c comprising a second device QUIC relay 174 configured to perform one or more network operations of a second type.

The process 500 continues at operation 512, where the network device 106a and the data aggregator 136 are configured to determine whether there is packet loss on the data stream 104a. If the network device 106a and the data aggregator 136 determine that packet loss is found in the data stream 104a (e.g., YES), then the process continues to operation 514. If the network device 106a and the data aggregator 136 determine that packet loss is not found in the data stream 104a (e.g., NO), then the process continues to operation 530.

At operation 514, the data aggregator 136 repeats data packet transmissions on the data stream 104a. At operation 516, the network device 106a and the data aggregator 136 correct the packet loss on the data stream 104a. At 518, the network device 106a forwards the data stream 104a to the network device 106b.

The process 500 continues at operation 522, where the network device 106c and the data aggregator 136 are configured to determine whether there is packet loss on the data stream 104b. If the network device 106c and the data aggregator 136 determine that packet loss is found in the data stream 104b (e.g., YES), then the process continues to operation 524. If the network device 106c and the data aggregator 136 determine that packet loss is not found in the data stream 104b (e.g., NO), then the process continues to operation 530.

At operation 524, the data aggregator 136 repeats data packet transmissions on the data stream 104b. At operation 526, the network device 106c and the data aggregator 136 correct the packet loss on the data stream 104b. At 528, the network device 106c forwards the data stream 104b to the network device 106b.

At operation 530, the network device 106b combines the data stream 104a and the data stream 104b into a local data stream 186. In some embodiments, the process 500 ends at operation 532, where the network device 106b presents the local data stream 186 for playback.

FIG. 6 shows respective examples of the operational flow 600, in accordance with one or more embodiments. In particular, FIG. 6 illustrates a third example of the system 100 configured to optimize streaming of aggregated data. The system 100 includes the server 102 communicatively coupled to the network device 106a and the network device 106c. In some embodiments, while network device 106a and the network device 106c are shown in communication with one another, fewer or more network devices 106 may be configured as intermediate nodes between the server 102 and the network device 106b. Further, while the server 102 is shown comprising the data aggregator 136 and the resources 150, the data aggregator 136 may be at a standalone location separate to that of the server 102.

In one or more embodiments, the data aggregator 136 may comprise cellular connectivity capabilities and internet connectivity capabilities, the network device 106a may comprise cellular connectivity capabilities and internet connectivity capabilities, and the network device 106c may comprise at least internet capabilities.

The system 100 may be configured to perform one or more publishing operations and/or subscribing operations. The data aggregator 136 may be a link aggregator or a VPN concentrator. The resources 150 may be part of one or more WebEx cloud applications or services coupled to the data aggregator 136 via one or more communication links. The network device 106a and the network device 106c may be hardware and/or software (executed by hardware) configured to perform one or more operations associated with user-facing devices.

In the example of FIG. 6, the system 100 performs operations 610-662 in which the system 100 optimizes streaming of aggregated video (e.g., visual data). At operation 620, the data aggregator 136 may be configured to exchange lower-bandwidth video with the network device 106a. At operation 630, the data aggregator 136 may publish higher-bandwidth video to the network device 106a via the network device 106c. At operations 610 and 612, the data aggregator 136 is configured to exchange higher-bandwidth/lower-bandwidth video with the resources 150 over the MoQ. At operation 662, the network device 106a may subscribe to higher-bandwidth video from the data aggregator 136 via the network device 106c. The network device 106a may comprise hotspot operations and may comprise a multipath QUIC (e.g., performing the one or more device QUIC multipath operations 172). Herein, the network device 106a may render a MoQ best quality video stream based on the lower-bandwidth video and the higher-bandwidth video. While FIG. 6 describes transmission of video streams, the system 100 may comprise transmission of one or more data types 152. The data types 152 may be different types of a same data (e.g., video transmitted at different resolution levels or in different protocols) or different data types altogether (e.g., visual data comprising image data or text data, sound data, and the like).

In the illustrated embodiment of FIG. 6, the system 100 comprises a model that illustrates Multipath QUIC technology, which may take a single QUIC connection and split a stream over two or more network paths. Herein, the network device 106a is a starting point for a request for specific data types 152, because it allows both WI-FI and cellular connections. The data aggregator 136 may retrieve media from the resources 150 and may send the media over both connections to the network device 106a. The multipath QUIC at the network device 106a may receive both a path A and a path B and multiplex them back together to form a best quality video stream.

FIG. 7 shows respective examples of the operational flow 700, in accordance with one or more embodiments. In particular, FIG. 6 illustrates a fourth example of the system 100 configured to optimize streaming of aggregated data. The system 100 includes the server 102 communicatively coupled to the network device 106a and the network device 106c. In some embodiments, while network device 106a and the network device 106c are shown in communication with one another, fewer or more network devices 106 may be configured as intermediate nodes between the server 102 and the network device 106b. Further, while the server 102 is shown comprising the data aggregator 136 and the resources 150, the data aggregator 136 may be at a standalone location separate to that of the server 102.

In one or more embodiments, the data aggregator 136 may comprise cellular connectivity capabilities and internet connectivity capabilities, the network device 106a may comprise cellular connectivity capabilities and internet connectivity capabilities, and the network device 106c may comprise at least internet capabilities.

The system 100 may be configured to perform one or more publishing operations and/or subscribing operations. The data aggregator 136 may be a link aggregator or a VPN concentrator. The resources 150 may be part of one or more WebEx cloud applications or services coupled to the data aggregator 136 via one or more communication links. The network device 106a and the network device 106c may be hardware and/or software (executed by hardware) configured to perform one or more operations associated with user-facing devices.

The data aggregator 136 may be a link aggregation or a VPN concentrator operating a QUIC Multipath Link Aggregator. The resources may be one or more WebEx cloud applications or services coupled to the data aggregator 136 via one or more communication links. The network device 106a may be hardware and/or software (executed by hardware) configured to perform one or more operations associated with user-facing devices. The network device 106a and the network device 106c may be configured to perform one or more cellular connectivity operations and one or more network connectivity operations.

In the example of FIG. 7, the system 100 performs operations 710-762 in which the system 100 optimizes streaming of aggregated video (e.g., visual data). At operation 720, the data aggregator 136 may be configured to detect lossiness and replicate data packets exchanged with the network device 106a. The lossiness may be detected at the data aggregator 136 and/or at the network devices 106. At operation 730, the data aggregator 136 may publish higher-bandwidth video to the network device 106a via the network device 106c. At operations 710 and 712, the data aggregator 136 is configured to exchange higher-bandwidth/lower-bandwidth video with the resources 150 over the MoQ. At operation 762, the network device 106a may subscribe to higher-bandwidth video from the data aggregator 136 via the network device 106c. The network device 106a may comprise hotspot operations and may comprise a multipath QUIC. The network device 106a may render a MoQ best quality video stream based on the exchanged data packets and the higher-bandwidth video. While FIG. 7 describes transmission of video streams, the system 100 may comprise transmission of one or more data types 152. The data types 152 may be different types of a same data (e.g., video transmitted at different resolution levels or in different protocols) or different data types 152 altogether (e.g., visual data comprising image data or text data, sound data, and the like).

In the illustrated embodiment of FIG. 7, the system 100 may comprise a model that illustrates the multipath QUIC, which may split a single QUIC connection over two network paths. Herein, the network device 106a may be a starting point for a request for specific data types, which allows both WI-FI and cellular connections. In one or more embodiments, the resources 150 may enable operations comprising the device QUIC multipath operations 172 for sending media over both connections to the data aggregator 136. The QUIC connections may go to a link aggregator in the data aggregator 136 that brings these two paths (e.g., Path A and Path B) back together and forms them into one going up into the resources 150. Each path may be configured/capable of higher-bandwidths of visual data and sound data. When loss is detected by the network device 106a, the data aggregator 136 may replicate packets on an alternative path (e.g., Path A). The server 102 may use the reception of replicated packets as a signal to reflect this behavior towards the sender (e.g., client). The system 100 may switch interfaces if quality continues to require replication. In some embodiments, the lossiness in the Path B is detected at the network device 106a, at the data aggregator 136, or a combination of both. For example, the lossiness may be detecting during operations of the network devices 106. It doesn't really matter.

FIG. 8 shows an example flowchart of a process 800 to perform resilient data plane processing operations using multiple data streams 104, in accordance with one or more embodiments. Modifications, additions, or omissions may be made to the process 800. The process 800 may include more, fewer, or other operations than those shown below. For example, operations may be performed in parallel or in any suitable order. While at times discussed as the server 102, the network devices 106, the server processor 124, the device stream controller 176, or components of any of thereof, any suitable system or components of the system 100 may perform one or more operations of the process 800. For example, one or more operations of the process 800 may be implemented, at least in part, in the form of software instructions 142 of FIG. 1, stored on a non-transitory computer readable medium, tangible, machine-readable media (e.g., the server memory 140 of FIG. 1) that when run by one or more processors (e.g., one or more server processors 124 of FIG. 1) may cause the one or more processors to perform the operations 802-840.

Referencing as a non-limiting example the operational flow 600 described in reference to FIG. 6 and the operational flow 700 described in reference to FIG. 7, the process 800 may start at operation 802, where the data aggregator 136 receives a request for a local data stream 186 from the network device 106a. The data aggregator 136 may comprise a QUIC relay 138 and be configured to perform one or more QUIC multipath operations 122. The network device 106a may comprise a device QUIC relay 174 and be configured to perform one or more device QUIC multipath operations 172. At operation 804, the data aggregator 136 is configured to receive data packets comprising one or more resources 150. At operation 806, the data aggregator 136 is configured to split the data packets into a data stream 104a and a data stream 104b. At operation 808, using multipath QUIC, the data aggregator 136 is configured to transmit the data stream 104a to the network device 106a configured to perform one or more network operations of a first type. At operation 810, using multipath QUIC, the data aggregator 136 is configured to transmit the data stream 104b to the network device 106c configured to perform one or more network operations of a second type.

The process 800 continues at operation 820, where the data aggregator 136 and the network device 106a determine whether loss is detected in the data stream 104a. If the data aggregator 136 and the network device 106a determine that no loss is detected in the data stream 104a (e.g., NO), then the process 800 continues to operation 822. If the data aggregator 136 and the network device 106a determine that loss is detected in the data stream 104a (e.g., YES), then the process 800 proceeds to operation 832.

At operation 822, the network device 106a combines the data stream 104a and the data stream 104b into the local data stream 186. At operation 832, the data aggregator 136 is configured to transmit a packet loss-corrected data stream 104c to the network device 106a via the one or more network operations of the first type. At operation 834, the network device 106a combines the packet loss-corrected data stream 104c and the data stream 104a into the local data stream 186.

In some embodiments, the process 800 ends at operation 840, where the network device 106a presents the local data stream 186 for playback.

FIG. 9 shows an example flowchart of a process 900 to perform resilient data plane processing operations using multiple data streams 104, in accordance with one or more embodiments. Modifications, additions, or omissions may be made to the process 900. The process 900 may include more, fewer, or other operations than those shown below. For example, operations may be performed in parallel or in any suitable order. While at times discussed as the server 102, the network devices 106, the server processor 124, the device stream controller 176, or components of any of thereof, any suitable system or components of the system 100 may perform one or more operations of the process 900. For example, one or more operations of the process 900 may be implemented, at least in part, in the form of software instructions 142 of FIG. 1, stored on a non-transitory computer readable medium, tangible, machine-readable media (e.g., the server memory 140 of FIG. 1) that when run by one or more processors (e.g., one or more server processors 124 of FIG. 1) may cause the one or more processors to perform the operations 902-952.

Referencing as a non-limiting example the system 100 described in reference to FIG. 1, the process 900 may start at operation 902, where the data aggregator 136 establishes a cloud connection with at least one of the network devices 106. The data aggregator 136 may be configured to perform one or more FEC operations and/or multipath QUIC operations. At operation 904, the data aggregator 136 is configured to obtain data packets comprising one or more resources 150. At operation 906, the data aggregator 136 may be configured to split the data packets into a data stream 104a and a data stream 104b. At operation 908, the data aggregator 136 is configured to transmit the data stream 104a to a network device 106a configured to perform one or more network operations of a first type. At operation 910, the data aggregator 136 is configured to transmit the data stream 104b to the network device 106c configured to perform one or more network operations of a second type. At operation 912 the system 100 is configured to optimize the transfer of the data streams 104 based on the types of data packets exchanged in the data stream 104a and the data stream 104b.

The process 300 continues at operation 920, where the system 100 is configured to determine whether the data stream 104a and the data stream 104b have same types of data packets. Herein, the data aggregator 136, the network device 106a, a network device 106b, and/or the network device 106c determine whether the data stream 104a and the data stream 104b are configured to provide the same type of data packets. In this regard, the system 100 is configured to determine whether the data stream 104a is configured to be A) a supplement to the data stream 104b or B) a replica of the data stream 104b. If the system 100 determines that the data stream 104a and the data stream 104b are not configured to provide the same type of data packets (e.g., NO), then the process 900 continues to operation 932. Herein, the system 100 determines that the data stream 104a is configured to be A) a supplement to the data stream 104b. At operation 932, the system 100 is configured to supplement data packets of the data stream 104b with data packets of the data stream 104a. If the system 100 determines that the data stream 104a and the data stream 104b are configured to provide the same type of data packets (e.g., YES), then the process 900 proceeds to operation 942. Herein, the system 100 determines that the data stream 104a is configured to be B) a replica of the data stream 104b. At operation 942, the system 100 is configured to supplement data packets of the data stream 104b with data packets of the data stream 104a.

In some embodiments, the process 300 ends at operation 950 and operation 952. At operation 950, the network device 106c is configured to aggregate a version of the data stream 104a and a version of the data stream 104b into a local data stream 186. At 952, the network device 106c is configured to present the local data stream 186 for playback.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figures above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate operations, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

The invention claimed is:

1. An apparatus, comprising:
a memory configured to store:
a local profile configured to indicate an association with a data aggregator configured to split one or more data streams; and
a processor communicatively coupled to the memory and configured to:
establish a connection with the data aggregator;
request access to one or more resources from the data aggregator, the data aggregator being configured to obtain the one or more resources and split the one or more resources into a first data stream comprising a first plurality of data packets and a second data stream comprising a second plurality of data packets;
upon performing a first plurality of network operations, receive the first data stream;
upon performing a second plurality of network operations, receive the second data stream;
determine whether the first plurality of data packets and the second plurality of data packets are of a same type;
in response to determining that the first plurality of data packets and the second plurality of data packets are the same type, determine that the second plurality of data packets are configured to replicate the first plurality of data packets;
in response to determining that the first plurality of data packets and the second plurality of data packets are not the same type, determine that the second plurality of data packets are configured to supplement the first plurality of data packets;
combine a version of the first data stream and a version of the second data stream into a local data stream; and
present the local data stream.

2. The apparatus of claim 1, wherein:
the first data stream comprises a first bandwidth;
the first data stream is received via a first network device configured to forward the first data stream between the data aggregator and the apparatus using a first Quick UDP Internet Connections (QUIC) relay;
the first network device receives the first data stream via one or more cellular communications from the data aggregator;
the first plurality of network operations comprise one or more short-range wireless communications;
the second data stream comprises a second bandwidth;
the second bandwidth is greater than the first bandwidth;
the second data stream is received via a second network device configured to forward the second data stream between the data aggregator and the apparatus using a second QUIC relay;
the second network device receives the second data stream via one or more internet communications from the data aggregator; and
the second plurality of network operations comprise one or more additional internet communications.

3. The apparatus of claim 2, wherein:
the first QUIC relay is a first portion of a transport layer network protocol configured to multiplex data between the data aggregator and the apparatus; and
the second QUIC relay is a second portion of the transport layer network protocol configured to multiplex data between the data aggregator and the apparatus.

4. The apparatus of claim 1, wherein:
the processor is further configured to:
in conjunction with determining that the second plurality of data packets are configured to replicate the first plurality of data packets, determine whether the second plurality of data packets comprise the first plurality of data packets;
in response to determining that the second plurality of data packets do not comprise the first plurality of data packets, determine packet loss on the second data stream; and
receive a packet loss-corrected data stream from the data aggregator;
the first data stream is the version of the first data stream received upon performing the first plurality of network operations; and
the packet loss-corrected data stream is the version of the second data stream configured to correct the packet loss on the second data stream.

5. The apparatus of claim 1, wherein:
the processor is further configured to:

in conjunction with determining that the second plurality of data packets are configured to replicate the first plurality of data packets, determine whether the second plurality of data packets comprise the first plurality of data packets; and in response to determining that the second plurality of data packets comprise the first plurality of data packets, determine no packet loss on the second data stream;

the version of the first data stream is the first data stream received upon performing the first plurality of network operations; and the version of the second data stream is the second data stream received upon performing the second plurality of network operations.

6. The apparatus of claim 1, wherein:
the first data stream is a video parity stream;
the first data stream is received via a first network device configured to forward the first data stream between the data aggregator and the apparatus;
the first network device receives the first data stream via one or more cellular communications from the data aggregator;
the first plurality of network operations comprise one or more short-range wireless communications;
the second data stream is a high-definition video stream;
the second data stream is received via a second network device configured to forward the second data stream between the data aggregator and the apparatus;
the second network device receives the second data stream via one or more internet communications from the data aggregator; and
the second plurality of network operations comprise one or more additional internet communications.

7. The apparatus of claim 1, wherein:
the first data stream comprises a first bandwidth;
the first data stream is received from the data aggregator upon performing a first plurality of multipath Quick UDP Internet Connections (QUIC) operations;
the first plurality of network operations comprise one or more cellular communications;
the second data stream comprises a second bandwidth;
the second bandwidth is greater than the first bandwidth;
the second data stream is received via a network device configured to forward the second data stream between the data aggregator and the apparatus upon performing a first plurality of multipath QUIC operations;
the network device receives the second data stream via one or more internet communications from the data aggregator; and
the second plurality of network operations comprise one or more additional internet communications.

8. A method, comprising:
establishing a connection with a data aggregator configured to split one or more data streams;
requesting access to one or more resources from the data aggregator, the data aggregator being configured to obtain the one or more resources and split the one or more resources into a first data stream comprising a first plurality of data packets and a second data stream comprising a second plurality of data packets;
upon performing a first plurality of network operations, receiving the first data stream;
upon performing a second plurality of network operations, receiving the second data stream;
determining whether the first plurality of data packets and the second plurality of data packets are of a same type;

in response to determining that the first plurality of data packets and the second plurality of data packets are the same type, determining that the second plurality of data packets are configured to replicate the first plurality of data packets;

in response to determining that that the first plurality of data packets and the second plurality of data packets are not the same type, determining that the second plurality of data packets are configured to supplement the first plurality of data packets;

combining a version of the first data stream and a version of the second data stream into a local data stream; and presenting the local data stream.

9. The method of claim 8, wherein:
the first data stream comprises a first bandwidth;
the first data stream is received via a first network device configured to forward the first data stream from the data aggregator using a first Quick UDP Internet Connections (QUIC) relay;
the first network device receives the first data stream via one or more cellular communications from the data aggregator;
the first plurality of network operations comprise one or more short-range wireless communications;
the second data stream comprises a second bandwidth;
the second bandwidth is greater than the first bandwidth;
the second data stream is received via a second network device configured to forward the second data stream from the data aggregator using a second QUIC relay;
the second network device receives the second data stream via one or more internet communications from the data aggregator; and
the second plurality of network operations comprise one or more additional internet communications.

10. The method of claim 9, wherein:
the first QUIC relay is a first portion of a transport layer network protocol configured to multiplex data from the data aggregator; and
the second QUIC relay is a second portion of the transport layer network protocol configured to multiplex data from the data aggregator.

11. The method of claim 8, further comprising:
in conjunction with determining that the second plurality of data packets are configured to replicate the first plurality of data packets, determining whether the second plurality of data packets comprise the first plurality of data packets;
in response to determining that the second plurality of data packets do not comprise the first plurality of data packets, determining packet loss on the second data stream; and
receiving a packet loss-corrected data stream from the data aggregator.

12. The method of claim 8, further comprising:
in conjunction with determining that the second plurality of data packets are configured to replicate the first plurality of data packets, determining whether the second plurality of data packets comprise the first plurality of data packets; and
in response to determining that the second plurality of data packets comprise the first plurality of data packets, determining no packet loss on the second data stream.

13. The method of claim 8, wherein:
the first data stream is a video parity stream;
the first data stream is received via a first network device configured to forward the first data stream from the data aggregator;

the first network device receives the first data stream via one or more cellular communications from the data aggregator;

the first plurality of network operations comprise one or more short-range wireless communications;

the second data stream is a high-definition video stream;

the second data stream is received via a second network device configured to forward the second data stream from the data aggregator;

the second network device receives the second data stream via one or more internet communications from the data aggregator; and the second plurality of network operations comprise one or more additional internet communications.

14. The method of claim 8, wherein:

the first data stream comprises a first bandwidth;

the first data stream is received from the data aggregator upon performing a first plurality of multipath Quick UDP Internet Connections (QUIC) operations;

the first plurality of network operations comprise one or more cellular communications;

the second data stream comprises a second bandwidth;

the second bandwidth is greater than the first bandwidth;

the second data stream is received via a network device configured to forward the second data stream from the data aggregator upon performing a first plurality of multipath QUIC operations;

the network device receives the second data stream via one or more internet communications from the data aggregator; and the second plurality of network operations comprise one or more additional internet network communications.

15. A non-transitory computer readable medium storing instructions that when executed by a processor cause the processor to:

establish a connection with a data aggregator configured to split one or more data streams;

request access to one or more resources from the data aggregator, the data aggregator being configured to obtain the one or more resources and split the one or more resources into a first data stream comprising a first plurality of data packets and a second data stream comprising a second plurality of data packets;

upon performing a first plurality of network operations, receive the first data stream;

upon performing a second plurality of network operations, receive the second data stream;

determine whether the first plurality of data packets and the second plurality of data packets are of a same type;

in response to determining that the first plurality of data packets and the second plurality of data packets are the same type, determine that the second plurality of data packets are configured to replicate the first plurality of data packets;

in response to determining that the first plurality of data packets and the second plurality of data packets are not the same type, determine that the second plurality of data packets are configured to supplement the first plurality of data packets;

combine a version of the first data stream and a version of the second data stream into a local data stream; and present the local data stream.

16. The non-transitory computer readable medium of claim 15, wherein:

the first data stream comprises a first bandwidth;

the first data stream is received via a first network device configured to forward the first data stream from the data aggregator using a first Quick UDP Internet Connections (QUIC) relay;

the first network device receives the first data stream via one or more cellular communications from the data aggregator;

the first plurality of network operations comprise one or more short-range wireless communications;

the second data stream comprises a second bandwidth;

the second bandwidth is greater than the first bandwidth;

the second data stream is received via a second network device configured to forward the second data stream from the data aggregator using a second QUIC relay;

the second network device receives the second data stream via one or more internet communications from the data aggregator; and the second plurality of network operations comprise one or more additional internet communications.

17. The non-transitory computer readable medium of claim 16, wherein:

the first QUIC relay is a first portion of a transport layer network protocol configured to multiplex data from the data aggregator; and the second QUIC relay is a second portion of the transport layer network protocol configured to multiplex data from the data aggregator.

18. The non-transitory computer readable medium of claim 15, wherein:

the instructions further cause the processor to:

in conjunction with determining that the second plurality of data packets are configured to replicate the first plurality of data packets, determine whether the second plurality of data packets comprise the first plurality of data packets; and in response to determining that the second plurality of data packets do not comprise the first plurality of data packets, determine packet loss on the second data stream;

receive a packet loss-corrected data stream from the data aggregator, the first data stream is the version of the first data stream received upon performing the first plurality of network operations; and the packet loss-corrected data stream is the version of the second data stream configured to correct the packet loss on the second data stream.

19. The non-transitory computer readable medium of claim 15, wherein:

the instructions further cause the processor to:

in conjunction with determining that the second plurality of data packets are configured to replicate the first plurality of data packets, determine whether the second plurality of data packets comprise the first plurality of data packets; and in response to determining that the second plurality of data packets comprise the first plurality of data packets, determine no packet loss on the second data stream;

the version of the first data stream is the first data stream received upon performing the first plurality of network operations; and the version of the second data stream is the second data stream received upon performing the second plurality of network operations.

20. The non-transitory computer readable medium of claim 15, wherein:

the first data stream is a video parity stream;
the first data stream is received via a first network device configured to forward the first data stream from the data aggregator;
the first network device receives the first data stream via one or more cellular communications from the data aggregator;
the first plurality of network operations comprise one or more short-range wireless communications;
the second data stream is a high-definition video stream;
the second data stream is received via a second network device configured to forward the second data stream from the data aggregator;
the second network device receives the second data stream via one or more internet communications from the data aggregator; and
the second plurality of network operations comprise one or more additional internet communications.

* * * * *